(12) United States Patent
Cathrine et al.

(10) Patent No.: US 11,847,056 B1
(45) Date of Patent: Dec. 19, 2023

(54) TECHNIQUE FOR CONTROLLING USE OF A CACHE TO STORE PREFETCHER METADATA

(71) Applicant: Arm Limited, Cambridge (GB)

(72) Inventors: Damien Matthieu Valentin Cathrine, Mougins (FR); Ugo Castorina, Antibes (FR); Luca Nassi, Antibes (FR)

(73) Assignee: Arm Limited, Cambridge (GB)

( * ) Notice: Subject to any disclaimer, the term of this patent is extended or adjusted under 35 U.S.C. 154(b) by 16 days.

(21) Appl. No.: 17/824,199

(22) Filed: May 25, 2022

(51) Int. Cl.
*G06F 12/08* (2016.01)
*G06F 12/0862* (2016.01)

(52) U.S. Cl.
CPC .... *G06F 12/0862* (2013.01); *G06F 2212/602* (2013.01)

(58) Field of Classification Search
CPC ............... G06F 12/0862; G06F 2212/602
USPC ........................................... 711/137
See application file for complete search history.

(56) References Cited

U.S. PATENT DOCUMENTS

2022/0019530 A1* 1/2022 Roberts ............... G06F 12/0862

* cited by examiner

*Primary Examiner* — Hua J Song
(74) *Attorney, Agent, or Firm* — NIXON & VANDERHYE P.C.

(57) ABSTRACT

An apparatus comprises prefetch circuitry, and a cache having a plurality of entries to store data for access by processing circuitry and blocks of metadata for reference by the prefetch circuitry. The prefetch circuitry can detect one or more access sequences in dependence on training inputs derived from demand accesses processed by the cache in response to memory access operations performed by the processing circuitry. On detecting a given access sequence, this causes an associated given block of metadata providing information indicative of the given access sequence to be stored in a selected entry of the cache. Eviction control circuitry, responsive to a victimisation event, performs an operation to select a victim entry in the cache, the victim entry being selected from one or more candidate victim entries. Each entry has an associated age indication value used to determine whether that entry is allowed to be a candidate victim entry, and the eviction control circuitry is arranged to perform a dynamic ageing operation to determine an ageing control value used to control updating of the associated age indication value for any entry storing a block of metadata. The dynamic ageing operation is arranged to determine the ageing control value in dependence on at least a training rate indication for the prefetch circuitry, where the training rate indication is indicative of a number of training inputs per memory access operation performed by the processing circuitry.

18 Claims, 14 Drawing Sheets

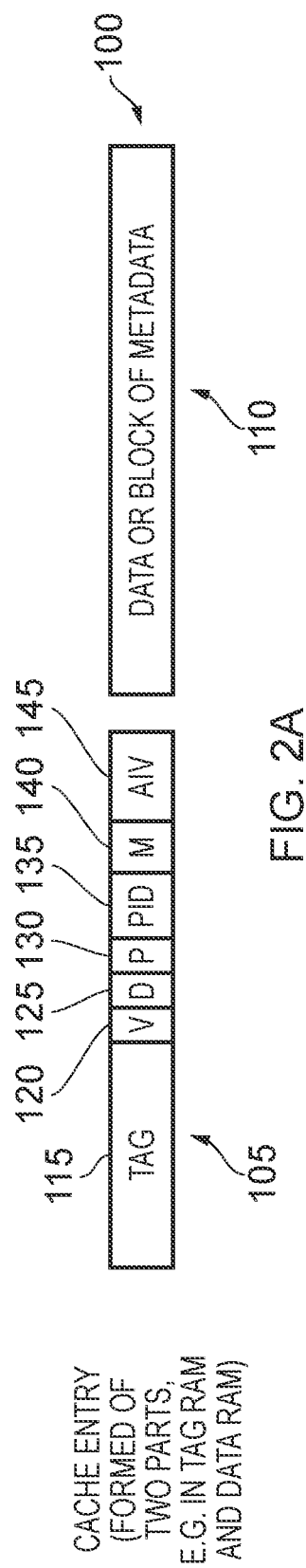
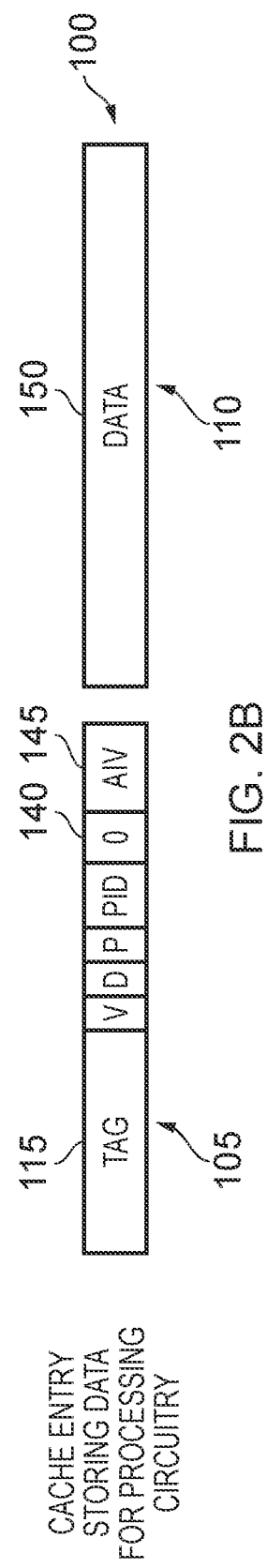
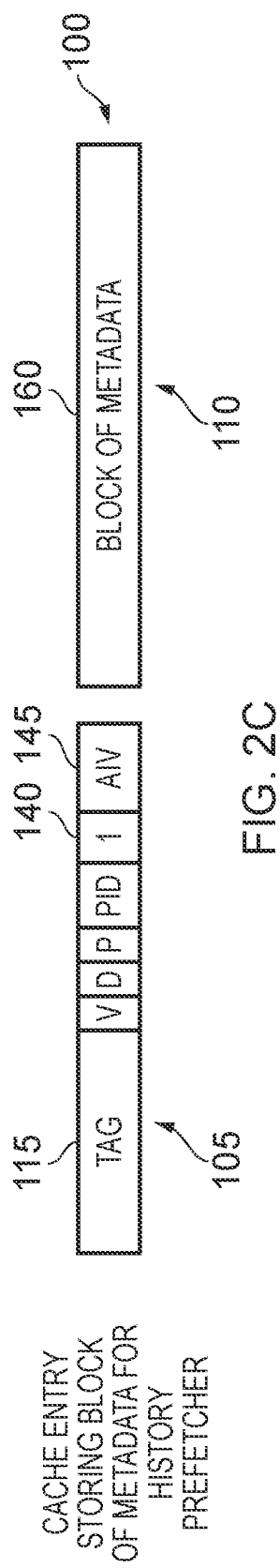

TECHNIQUE FOR CONTROLLING USE OF A CACHE TO STORE PREFETCHER METADATA

BACKGROUND

The present technique relates to the field of data processing, and more particularly relates to the use of a cache to store prefetcher metadata.

It is known to provide prefetch circuitry in association with a cache, where the prefetch circuitry seeks to pre-empt one or more demand accesses that may be issued by processing circuitry to access data in the cache, and then seeks to prefetch that data into the cache ahead of such a demand access being made for that data.

Various types of prefetch circuitry are known, but one type of prefetch circuitry is history prefetch circuitry, which monitors demand accesses performed by the processing circuitry in order to seek to identify one or more sequences of accesses. By such an approach, if it is later predicted by the history prefetch circuitry that such a sequence of accesses is to be initiated by the processing circuitry, one or more prefetch requests can be issued to seek to prefetch the required data into the cache ahead of that sequence of accesses being initiated. However, the amount of information that needs to be stored to identify such a sequence of accesses can be significant, and accordingly it may be decided to store, within the cache, metadata used to identify such a sequence of accesses, so that that metadata can be referred to in future by the history prefetch circuitry.

An issue that then arises is how to use the cache efficiently to store both data for access by the processing circuitry when performing its data processing operations, and metadata identifying the above-mentioned one or more access sequences for reference by the prefetch circuitry.

SUMMARY

In one example arrangement, there is provided an apparatus comprising: prefetch circuitry; and a cache having a plurality of entries to store data for access by processing circuitry and blocks of metadata for reference by the prefetch circuitry; wherein: the prefetch circuitry is arranged to detect one or more access sequences in dependence on training inputs derived from demand accesses processed by the cache in response to memory access operations performed by the processing circuitry and, on detecting a given access sequence, to cause an associated given block of metadata providing information indicative of the given access sequence to be stored in a selected entry of the cache; the apparatus further comprising: eviction control circuitry, responsive to a victimisation event, to perform an operation to select a victim entry in the cache, the victim entry being selected from one or more candidate victim entries; wherein each entry has an associated age indication value used to determine whether that entry is allowed to be a candidate victim entry, the eviction control circuitry is arranged to perform a dynamic ageing operation to determine an ageing control value used to control updating of the associated age indication value for any entry storing a block of metadata, and the dynamic ageing operation is arranged to determine the ageing control value in dependence on at least a training rate indication for the prefetch circuitry, where the training rate indication is indicative of a number of training inputs per memory access operation performed by the processing circuitry.

In another example arrangement, there is provided a method of controlling use of a cache to store blocks of metadata for reference by prefetch circuitry, comprising: arranging the cache to have a plurality of entries to store data for access by processing circuitry and the blocks of metadata for reference by the prefetch circuitry; employing the prefetch circuitry to detect one or more access sequences in dependence on training inputs derived from demand accesses processed by the cache in response to memory access operations performed by the processing circuitry and, on detecting a given access sequence, to cause an associated given block of metadata providing information indicative of the given access sequence to be stored in a selected entry of the cache; responsive to a victimisation event, employing eviction control circuitry to perform an operation to select a victim entry in the cache, the victim entry being selected from one or more candidate victim entries, each entry having an associated age indication value used to determine whether that entry is allowed to be a candidate victim entry; and performing a dynamic ageing operation to determine an ageing control value used to control updating of the associated age indication value for any entry storing a block of metadata, and the dynamic ageing operation determining the ageing control value in dependence on at least a training rate indication for the prefetch circuitry, where the training rate indication is indicative of a number of training inputs per memory access operation performed by the processing circuitry.

In a still further example arrangement, there is provided a non-transitory computer-readable medium to store computer-readable code for fabrication of an apparatus comprising: prefetch circuitry; and a cache having a plurality of entries to store data for access by processing circuitry and blocks of metadata for reference by the prefetch circuitry; wherein: the prefetch circuitry is arranged to detect one or more access sequences in dependence on training inputs derived from demand accesses processed by the cache in response to memory access operations performed by the processing circuitry and, on detecting a given access sequence, to cause an associated given block of metadata providing information indicative of the given access sequence to be stored in a selected entry of the cache; the apparatus further comprising: eviction control circuitry, responsive to a victimisation event, to perform an operation to select a victim entry in the cache, the victim entry being selected from one or more candidate victim entries; wherein each entry has an associated age indication value used to determine whether that entry is allowed to be a candidate victim entry, the eviction control circuitry is arranged to perform a dynamic ageing operation to determine an ageing control value used to control updating of the associated age indication value for any entry storing a block of metadata, and the dynamic ageing operation is arranged to determine the ageing control value in dependence on at least a training rate indication for the prefetch circuitry, where the training rate indication is indicative of a number of training inputs per memory access operation performed by the processing circuitry.

BRIEF DESCRIPTION OF THE DRAWINGS

The present technique will be described further, by way of illustration only, with reference to examples thereof as illustrated in the accompanying drawings, in which:

FIGS. 2A, 2B and 2C schematically illustrate information that may be provided within cache entries in accordance with one example implementation;

DESCRIPTION OF EXAMPLES

Figure 1:
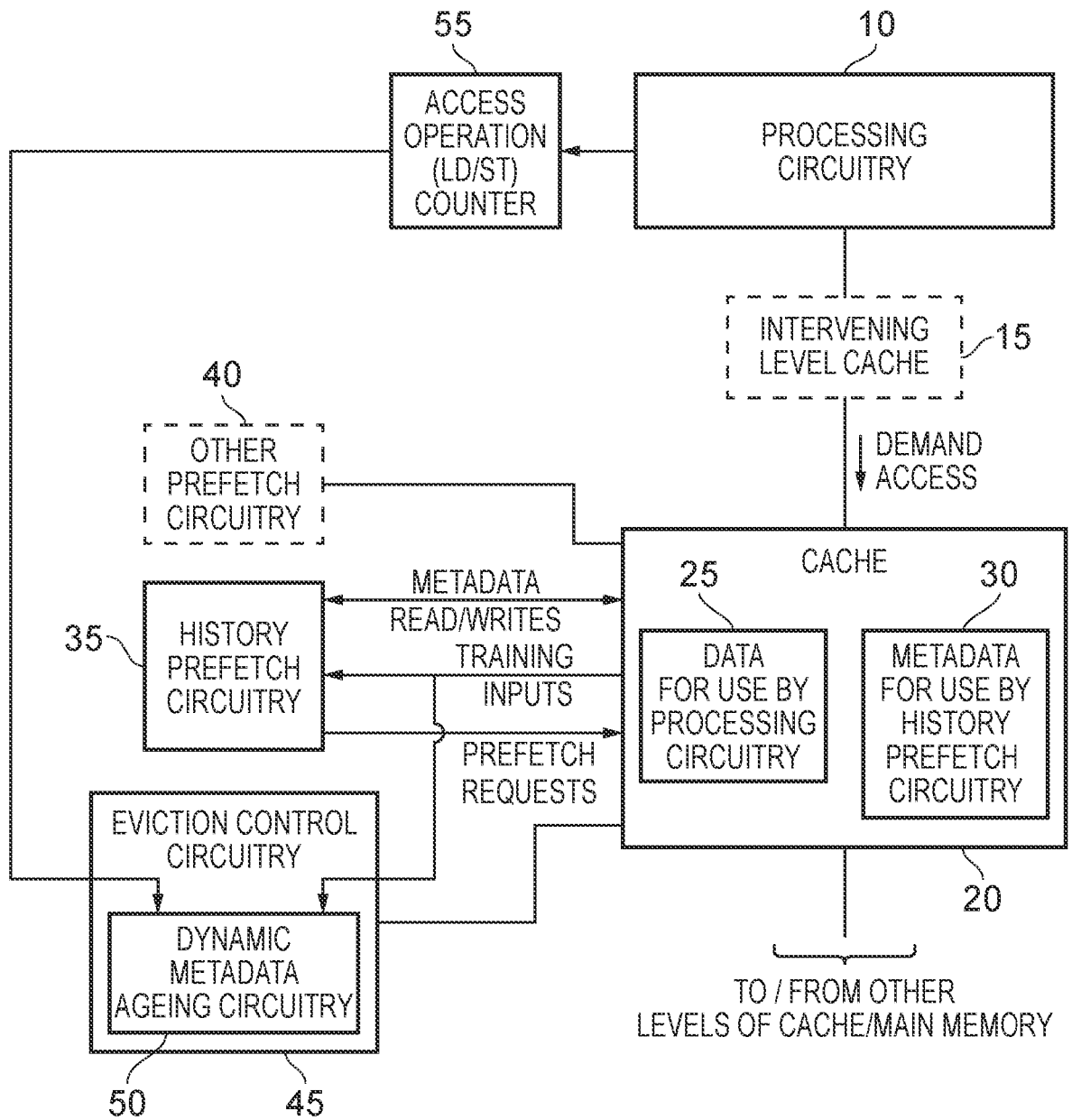
FIG. 1 is a block diagram of a system incorporating an apparatus in accordance with one example implementation.

As discussed earlier, when employing prefetch circuitry of the type that seeks to detect one or more access sequences from a history of demand accesses to the cache, so that one or more prefetch requests can later be made if it is detected that such an access sequence is likely to be repeated, it can be useful to store metadata within the cache to provide details of each access sequence detected by the prefetch circuitry. However, an issue that arises is how to make efficient use of the cache to store both data for access by processing circuitry when performing data processing operations, and metadata used by the prefetch circuitry to provide information about each identified access sequence to assist the prefetch circuitry in making future prefetch decisions.

In particular, when it is desired to allocate new data or metadata into an entry of the cache (each cache entry in one example implementation taking the form of a cache line), it is often necessary to identify a victim entry (victim cache line) whose current content is to be overwritten with the new data or metadata. Sometimes the current content of the victim cache line will need to be evicted to memory as part of the above process so as to avoid loss of data. Typically, a replacement policy will be applied to determine which cache line to select as the victim cache line. However, applying the same replacement policy in respect of all of the cache lines, irrespective of whether they store data for use by the processing circuitry, or metadata for use by the prefetch circuitry, is likely to be suboptimal, as it has been found that metadata information for use by the prefetch circuitry often benefits from being kept within the cache for much longer periods than the data used by the processing circuitry when performing its data processing operations.

In addition, the usefulness of the metadata may vary dependent on the type of workload being performed by the processing circuitry, or indeed the type of workload being performed by any other processing elements that may have access to the cache.

The techniques described herein aim to take the above factors into account, and provide a more flexible and efficient mechanism for controlling use of the cache to store metadata for use by the prefetch circuitry.

In one example implementation, an apparatus is provided that has prefetch circuitry, and a cache having a plurality of entries (e.g. a plurality of cache lines) to store data for access by processing circuitry and blocks of metadata for reference by the prefetch circuitry. The prefetch circuitry may be arranged to detect one or more access sequences in dependence on training inputs derived from demand accesses processed by the cache in response to memory access operations performed by the processing circuitry. On detecting a given access sequence, the prefetch circuitry can be arranged to cause an associated given block of metadata providing information indicative of the given access sequence to be stored in a selected entry of the cache. The apparatus further comprises eviction control circuitry, responsive to a victimisation event, to perform an operation to select a victim entry in the cache, the victim entry being selected from one or more candidate victim entries. Once the victim entry has been selected, then its current contents can be overwritten with new contents, and if necessary the current contents can be evicted for storage in a lower level of cache or main memory before they are overwritten, so as to ensure that the current contents are not lost. Eviction may for example be appropriate if the current contents store valid and dirty data used by the processing circuitry, the flagging of the data as dirty indicating that that data is more up-to-date than the copy of that data stored in main memory.

Each entry can be arranged to have an associated age indication value used to determine whether that entry is allowed to be a candidate victim entry, and the eviction control circuitry may be arranged to perform a dynamic ageing operation to determine an ageing control value used to control updating of the associated age indication value for any entry storing a block of metadata. By such an approach, this can allow the replacement policy used in association with cache lines storing blocks of metadata to differ from the replacement policy used in association with cache lines storing normal data used by the processing circuitry, since cache lines storing blocks of metadata can be arranged to age differently to cache blocks storing normal data.

Furthermore, through use of the dynamic ageing operation, the ageing control value can vary dependent on the inputs used by the dynamic ageing operation, so that the ageing of blocks of metadata can be sped up or slowed down dependent on those inputs, to thereby seek to make most efficient use of the cache resources. More particularly, in one example implementation the dynamic ageing operation is arranged to determine the ageing control value in dependence on at least a training rate indication for the prefetch circuitry, where the training rate indication is indicative of a number of training inputs per memory access operation performed by the processing circuitry.

It has been found that such a training rate indication can provide a useful metric as to the relative benefit that is being observed from the retention of blocks of metadata within the cache. In particular, if a relatively low number of training inputs are being received by the prefetch circuitry per memory access operation performed by the processing circuitry, this implies that the processing circuitry is able to access a significant proportion of its data without relying on the activities of the prefetch circuitry. This could be the case for a variety of reasons. For example, it may be the case that the activities of other prefetch circuits provided in the system are proving more effective at reliably predicting the data to be prefetched given the current workload of the processing circuitry. Alternatively, it may be that the set of data required by the processing circuitry, having regard to its current workload, fits comfortably within the cache, leading to a reduction in the number of training inputs being received by the prefetch circuitry (since prefetching is not needed if the required data is already in the cache). Hence it may be appropriate to age the blocks of metadata more quickly if a relatively low number of training inputs are being received by the prefetch circuitry per memory access operation performed by the processing circuitry, so that they become candidates for eviction more quickly, thereby tending to reduce the amount of space within the cache used to store such blocks of metadata.

Conversely, if a relatively high number of training inputs are being received by the prefetch circuitry per memory access operation performed by the processing circuitry, this may be indicative of the prefetch circuitry being used to a larger extent to prefetch data required by the processing circuitry, and hence it may be more useful to retain blocks of metadata stored in the cache by the prefetch circuitry for longer. Hence, the relatively high training rate in this case can be used to age the blocks of metadata more slowly, so that they are retained within the cache for longer.

It has been found that such a dynamic approach to the ageing of blocks of metadata can significantly improve performance, whilst making more efficient use of the available cache resources. It can also reduce power consumption by reducing the amount of cache refills (where data is evicted only later to be retrieved again into the cache) that may otherwise be required.

Once a block of metadata has been stored within the cache, then the prefetch circuitry may be arranged, in response to a trigger event causing the associated given block of metadata to be retrieved from the cache, to determine from the given access sequence one or more prefetch requests to be issued to request the prefetching of data into one or more entries of the cache in anticipation of access to that data being sought by at least one future demand access.

The trigger event can take a variety of forms. For example, in one implementation the trigger event may be detected when a demand access received by the cache specifies a memory address that causes a hit within the cache entry storing the given block of metadata. For instance, a trigger address can be associated with the given access sequence (for example identifying the first memory address within the given access sequence) and that trigger address can be used to identify the given block of metadata in the cache. When a demand access specifies a memory address matching the trigger address, then this will cause a hit to be detected within the cache for the given block of metadata, and such a hit can be used as the trigger event to cause the given block of metadata to be provided to the prefetch circuitry. As another example form of trigger event, a period where there is a relatively low level of demand accesses could be used, if desired, to speculatively retrieve the given block of metadata from the cache, in order to cause prefetching to take place based on the given access sequence indicated by that given block of metadata.

Whilst the above-mentioned training rate indication may form the only input used by the dynamic ageing operation when determining the ageing control value, in one example implementation the dynamic ageing operation performed by the eviction control circuitry is arranged to determine the ageing control value in dependence on both the training rate indication for the prefetch circuitry and a coverage indication for the prefetch circuitry. The coverage indication is indicative of a proportion of the demand accesses processed by the cache for which the data to be accessed in response to the demand accesses is present in the cache due to prefetching activity of the prefetch circuitry. The coverage indication can hence indicate how well the prefetch circuitry is operating, and in particular give an indication of the extent to which cache misses are being avoided by virtue of the prefetching performed by the prefetch circuitry (hence intrinsically capturing some information about the timeliness of the prefetch circuitry itself). Whilst it has been found that using the coverage indication by itself may not provide a useful mechanism for deciding how to dynamically adjust the above-mentioned ageing control value, it has been found that using the coverage indication in combination with the above-mentioned training rate indication can provide a very effective mechanism for deciding how to adjust the ageing control value, so as to speed up or slow down the ageing of blocks of metadata based on the prevailing operating conditions/workloads being observed, in order to improve performance of the system, and efficient utilisation of the cache resources.

In one example implementation, when a cache line is prefetched into the cache, it is marked as a prefetched line, and then if subsequently a demand access results in a hit on such a prefetched line (such a hit being referred to herein as a cache prefetch hit or a pseudo miss), the prefetched line is then marked as a normal cache line. Hence, any such cache prefetch hit can be distinguished from a normal cache hit, and hence provides an indication of a hit that would otherwise have been a miss within the cache had it not been for the prefetch activity. In one example implementation the coverage indication can be determined using information about the number of cache prefetch hits being observed due to the activities of the prefetch circuitry, since this information can be used to indicate the proportion of demand accesses that have been turned into a cache hit as a result of the prefetching activity (when otherwise a miss would have been detected).

There are various ways in which the eviction control circuitry can obtain the information required to enable it to evaluate the training rate indication, and if required the coverage indication. In one example implementation, the eviction control circuitry comprises training counter circuitry to maintain a training count value indicating a number of training inputs received by the prefetch circuitry since a counter initialisation event.

There are a number of ways in which the training inputs can be generated. In one particular example implementation, the prefetch circuitry is arranged to receive a training input each time a demand access processed by the cache results in a cache miss, or results in a cache prefetch hit due to prefetching performed in response to a prefetch request issued by the prefetch circuitry. As will be apparent from the earlier discussion, a cache prefetch hit represents the first hit on data that has been prefetched into the cache, and hence may also be referred to as a "first hit on a prefetched cache entry/cache line". It may also be referred to as a pseudo miss, as in the absence of the prefetching activity there would have been a cache miss, but that cache miss has been avoided by virtue of the prefetching activity.

In one example implementation, the eviction control circuitry has an input interface to receive an indication of a number of memory access operations performed by the processing circuitry since the counter initialisation event. The indication of the number of memory access operations performed by the processing circuitry can be maintained in a variety of ways, but could in one example implementation be maintained by an access operation counter (which may also be referred to herein as a load/store counter) provided in association with the processing circuitry to monitor the throughput of memory access operations. Such an access operation counter provided in association with the processing circuitry may be organised so as to exclude redundant access operations, for instance in the case of aborts, replays or cancels occurring within the processing circuitry.

When the eviction control circuitry is arranged to receive such an indication of the number of memory access operations, the eviction control circuitry may then comprise training rate determination circuitry to determine the training rate indication by dividing the training count value by the indication of the number of memory access operations performed by the processing circuitry. This provides a simple and effective mechanism for allowing the training rate indication to be re-evaluated as and when required.

The eviction control circuitry may be arranged to perform the dynamic ageing operation to re-determine the ageing control value each time a re-evaluation trigger is detected. The frequency with which the dynamic ageing operation is invoked may be varied dependent on implementation. However, it is generally expected that it will be beneficial to only re-invoke the dynamic ageing operation at relatively large time intervals, since it will typically be necessary to maintain metadata within the cache for a significantly longer lifetime than the normal data used by the processing circuitry during the performance of its data processing operations. By choosing a relatively long period between the performance of the dynamic ageing operation, this can improve stability. Hence, the re-evaluation trigger will in one example implementation be arranged only to repeat after relatively long time periods.

There are various ways in which the re-evaluation trigger can be detected. However, in one example implementation the re-evaluation trigger is detected when the indication of the number of memory access operations performed by the processing circuitry as received at the input interface reaches a predetermined value. By appropriate choice of the predetermined value, this can ensure that a relatively large time period passes between each re-evaluation trigger, hence providing a simple and effective mechanism for triggering re-performance of the dynamic ageing operation.

As mentioned earlier, the training counter circuitry maintains a training count value that indicates the number of training inputs received by the prefetch circuitry since a counter initialisation event. The counter initialisation event can take a variety of forms, but in one example implementation is determined to occur in response to re-determination of the ageing control value. Hence, after each performance of the dynamic ageing operation, the training counter circuitry can be reset.

In one example implementation, the training counter circuitry can be arranged to maintain multiple different count values. In particular, in such an example implementation, the training counter circuitry can be used to maintain a first training count value indicating a total number of training inputs received by the prefetch circuitry since the earlier-mentioned counter initialisation event, and a second training count value indicating a number of training inputs received by the prefetch circuitry indicating a cache prefetch hit since the counter initialisation event.

Such an approach can be particularly useful when arranging the dynamic ageing operation to determine the ageing control value in dependence on both the training rate indication and the coverage indication. In particular, the eviction control circuitry may then be arranged to comprise coverage determination circuitry to determine the coverage indication by dividing the second training count value by the first training count value. This provides of a simple and effective mechanism for re-evaluating the coverage indication as and when required.

The ageing control value can take a variety of forms, but in one example implementation the eviction control circuitry is arranged to perform the dynamic ageing operation to select, as the ageing control value, an ageing threshold value in dependence on at least the training rate indication for the prefetch circuitry. As mentioned earlier, in one particular example implementation both the training rate indication and the coverage indication are used when determining the ageing control value, and hence both indications can be used to influence selection of the above-mentioned ageing threshold value.

The way in which the dynamic ageing operation selects the ageing threshold value in dependence on both the training rate indication and the coverage indication can take a variety of forms. However, in one example implementation, the eviction control circuitry has access to a two dimensional array of predetermined ageing threshold values, and may be arranged to select from the two dimensional array one of the predetermined ageing threshold values based on both the training rate indication and the coverage indication.

The determined ageing threshold value can be used in a variety of ways. However, in one example implementation the apparatus further comprises a global ageing counter that is incremented each time an incrementing event is detected, and an update of the associated age indication value of an entry storing a block of metadata is inhibited unless the global ageing counter has reached the ageing threshold value. Such an approach hence enables the rate at which blocks of metadata are aged to be sped up or slowed down depending on how the ageing threshold value is altered, which in turn can affect how long blocks of metadata are retained within the cache, and hence the proportion of the cache that may be available for storing normal data versus metadata.

The incrementing event that causes the global ageing counter to be incremented can take a variety of forms, but in one example implementation the incrementing event is detected each time the victimisation event is detected. Hence, each time a victim entry is to be selected, the global ageing counter can be incremented.

Particular example implementations will now be discussed with reference to the figures.

FIG. 1 is a block diagram of a system incorporating an apparatus according to an example implementation of the present invention. Processing circuitry 10 is provided for performing data processing operations, during which memory access operations are performed in order to load data from memory or store data to memory. Interposed between the processing circuitry and memory are one or more levels of cache, including at least the cache 20. When the processing circuitry wishes to perform a memory access operation, then it issues a demand access (also referred to herein as a demand access request) giving an indication of the memory address to be accessed, and that demand access is processed by the cache 20 in order to determine whether the data at the indicated memory address is already stored within the cache or not. If the data is stored within the cache, then a hit in the cache is detected, and the access operation may be performed with reference to the data stored in the cache. Hence, in the event of a read access operation the requested data can be returned to the processing circuitry, and in the event of a write access operation the current data stored within the cache can be updated using the data specified for the write access operation. If the data is not stored within the cache, then a miss in the cache is detected, and the demand access may be propagated on from the cache 20 to any other lower levels of cache or to memory for processing.

As shown in FIG. 1, there may be one or more intervening levels of cache 15 between the processing circuitry 10 and the cache 20, in which case a demand access issued by the processing circuitry may be processed first by the intervening level/levels of cache 15, and if a hit is detected in such an intervening level of cache then the associated memory access operation can be performed without forwarding the demand access on to the cache 20. However, the demand access will be forwarded to the cache 20 in the event of a miss being detected in any intervening level of cache 15.

To seek to improve the performance of the cache 20, history prefetch circuitry is provided in association with the cache. In response to the various demand accesses processed by the cache 20, a series of training inputs are provided to the history prefetch circuitry 35, and the history prefetch circuitry 35 analyses those training inputs in order to seek to detect one or more sequences of accesses. In particular, it has been found that there are various access sequences that may be repeated during the workload performed by the processing circuitry, and the aim of the history prefetch circuitry is to seek to detect one or more access sequences that are considered likely to be repeated (for example because they have been observed a number of times from analysis of the training inputs received by the history prefetch circuitry 35). Once an access sequence has been detected, then the history prefetch circuitry 35 is arranged to generate a block of metadata providing information indicative of the access sequence, and output that block of metadata to the cache for storing therein, so that it is available for subsequent reference by the history prefetch circuitry.

How it is determined where to store the block of metadata within the cache may vary dependent on implementation. However, in one example implementation, a trigger address can be associated with the given access sequence (for example identifying the first memory address within the given access sequence) and that trigger address can be used to determine where within the cache the given block of metadata is stored. For instance, in an N-way set associative cache an index portion of the trigger address may be used to determine a set within the cache containing multiple cache lines (typically one cache line per way of the cache), with the given block of metadata then being stored within one of those cache lines of the set, and with a tag portion of the trigger address also being stored in association with that cache line.

Hence, as shown in FIG. 1, the cache 20 may, at any point in time, store within its various entries (also referred to herein as cache lines) both data 25 for use by the processing circuitry, and metadata 30 for use by the history prefetch circuitry 35.

On occurrence of a trigger event, the history prefetch circuitry can be arranged to issue one or more prefetch requests to the cache 20 to cause data sufficient to fill one or more cache lines to be retrieved from lower levels of cache or main memory for storing within the cache, in anticipation of that data in due course being the subject of a demand access issued by the processing circuitry. Such a trigger event may occur when the processing of a demand access by the cache 20 results in a hit in a cache line of the cache that is storing a block of metadata. This for example may arise if the demand access specifies a memory address that matches the earlier-mentioned trigger address associated with the block of metadata.

In that event, the block of metadata may be read into the history prefetch circuitry from the cache, and then analysed by the history prefetch circuitry in order to determine the associated access sequence indicated by that block of metadata. For example, the block of metadata may include sufficient information to enable the history prefetch circuitry to determine the memory address of each access in the sequence (for instance with reference to the earlier-mentioned trigger address). Once the history prefetch circuitry has determined this information, it can then issue one or more prefetch requests to the cache 20 to cause the data associated with one or more of those memory addresses to be prefetched into the cache 20.

It has been found that such an approach provides an efficient mechanism for storing the relatively large amount of information required by the history prefetch circuitry in order to enable the history prefetch circuitry to operate in a timely and effective manner to prefetch data anticipated to be required by the processing circuitry, and thereby improve performance of the processing circuitry by increasing the number of hits in the cache 20 observed for the demand accesses issued by the processing circuitry.

If desired, as indicated by the dotted box 40 in FIG. 1, one or more other forms of prefetch circuitry may also be provided, to implement other prefetch mechanisms to seek to identify data to be prefetched into the cache 20. The various prefetch circuits can operate independently of each other, and by using additional prefetch circuits it may be possible to further improve performance.

An issue that arises when using the history prefetch circuitry 35 in the manner discussed above is how to make best use of the resources of the cache 20 taking into account the varying workloads that may be being performed by the processing circuitry 10, and indeed by any other processing elements that may have access to the cache 20 (whilst in FIG. 1 only the processing circuitry 10 is shown as having access to the cache 20, in some implementations the cache 20 may be a shared cache that is accessible not only to the processing circuitry 10 but also to one or more other processing elements). In particular, there may be periods of time where the operations of the history prefetch circuitry 35 are proving particularly effective in prefetching data required by the processing circuitry 10, hence justifying the retention of relatively large amounts of metadata 30 within the cache. However, during other periods of time the operations of the history prefetch circuitry may be less effective, and in such instances it may be better to free up more of the cache 20 for the storage of data for use by the processing circuitry 10.

In order to free up space within the cache 20 for storage of new data or metadata, eviction control circuitry 45 is provided that seeks to identify victim cache lines whose current content can be discarded from the cache 20 to make room for new content. As part of that operation of discarding the current content, an eviction process may be performed to output that content to a lower level of cache or main memory, so that that content is not lost. This may for example be appropriate when the victim cache line contains valid and dirty data, the dirty flag identifying that the current content is more up-to-date than the content held in main memory, and hence should not merely be deleted, but instead should be output to a lower level of cache or main memory.

The eviction control circuitry 45 may be arranged to apply a replacement policy to determine which entry to select as the victim entry. This may involve applying an ageing technique to selectively age cache lines of data held within the cache, and then selecting the victim entry from amongst one or more candidate victim entries that have reached a certain age. Such an approach can enable older, less used, cache lines to be evicted in preference to newer, more frequently used, cache lines.

However, applying the same replacement policy in respect of all of the entries, irrespective of whether they store data 25 for use by the processing circuitry, or metadata 30 for use by the prefetch circuitry, is likely to be suboptimal, as it is typically the case that blocks of metadata 30 need to be retained for a significantly longer period of time within the cache 20 in order for them to be useful to the history prefetch circuitry, than is typically the case for the data 25 used by the processing circuitry. Thus it may be appropriate to seek to age the blocks of metadata 30 more slowly than the data of 25. However, a static scheme may not provide the best results, since as mentioned earlier the performance of the history prefetch circuitry 35 (i.e. how well it is causing data to be prefetched that is subsequently required by the processing circuitry) may vary depending on a number of factors, such as the type of workload currently being performed by the processing circuitry 10 or indeed by other processing elements making use of the cache, the performance of any other types of prefetch circuit also provided within the system, etc.

As will be discussed in more detail below, the techniques described herein employ dynamic metadata ageing circuitry 50 within the eviction control circuitry 45 to seek to perform a dynamic ageing operation that can be used to vary the speed with which blocks of metadata 30 are aged, and hence influence how quickly or slowly those blocks of metadata become candidates for eviction. This in turn can influence the amount of metadata 30 held within the cache 20, thereby for example allowing more metadata 30 to be stored when the history prefetch circuitry 35 is performing well, whilst enabling a reduction in the amount of metadata 30 stored within the cache when the history prefetch circuitry is performing less well. It has been found that such an approach can significantly improve performance, and allow a more effective utilisation of the cache resources 20 taking into account the prevailing operating conditions of the system.

As will be discussed in more detail later, and as illustrated schematically in FIG. 1, the dynamic metadata ageing circuitry 50 can receive a number of inputs that are used when performing the dynamic ageing operation. These include the training inputs discussed earlier that are sent to the history prefetch circuitry 35, and information about the number of access operations performed by the processing circuitry 10, such as may be provided by an access operation counter 55 provided in association with the processing circuitry 10 (such an access operation counter also being referred to herein as a load/store counter).

FIG. 2A schematically illustrates the information that may be provided within a cache entry/cache line 100. The cache line 100 can be considered to be formed of two parts, namely a first part 110 that stores a block of data or a block of metadata, and a second part 105 that stores various information associated with that block of data or block of metadata. The way in which this information is stored within the cache may vary dependent on implementation, but in one specific example implementation the cache may include one or more data RAMs for storing the first parts 110 of multiple cache lines, and one or more TAG RAMs for storing the associated second parts 105 of those multiple cache lines.

Considering the second part 105 of a given cache line, then as shown in FIG. 2A multiple pieces of information may be stored within that part. A first field 115 can be used to store a tag value, which is a portion of the address associated with the data or metadata held in the associated first part 110 of the given cache line. As will be understood by those of ordinary skill in the art, the portion of the address stored as the tag value will be dependent on implementation. However, by way of specific example, if the cache takes the form of an N-way set associative cache, an index portion of an address is used to identify a particular set within the cache (that set typically including one cache line within each way of the cache), and then another portion of the address forms a tag comparison portion to be compared with the tag value stored within the first field 115 of each cache line in that identified set.

A valid field 120 is used to identify whether the contents of the cache line are valid, and a dirty field 125 is used to identify whether data stored within the cache line is more up-to-date than the version of that data stored in memory (in one example implementation, when a block of metadata is stored in a cache line the dirty field is not used since such metadata is not stored in memory, and hence the dirty field can be re-used to encode other information if required). A prefetch indication field 130 is used to identify if the data in the cache line is in the cache due to prefetching activity but has not yet been accessed by the processing circuitry, whilst the associated prefetch identifier (ID) field 135 can be used to identify which prefetch circuit 35, 40 has caused the data to be prefetched. If a hit is detected on a cache line whose prefetch indication field is set to identify the data as having been prefetched but not yet accessed, then this is referred to as a cache prefetch hit or a pseudo miss, and indicates a first hit on data that has been prefetched. At this point, the access is allowed to proceed using the content of the cache line that is hit, and at the same time the prefetch indication is cleared to identify the cache line as a normal cache line for future purposes.

As also shown in FIG. 2A, a metadata flag 140 may be provided to identify whether the associated first part 110 of the cache line 100 stores data or metadata Finally, an age indication value (AIV) field 145 can be used to store an AIV indicative of an age associated with the cache line contents. This AIV may also be referred to as a replacement policy counter value, since it is referred to by the eviction control circuitry when deciding whether a cache line may be considered as a candidate victim cache line or not, when the eviction control circuitry is seeking to identify a victim cache line whose contents can be discarded/evicted. The exact term used for the ageing information in the field 145 may vary dependent on the replacement policy implemented, but in one specific example such ageing information is referred to as a Re-Reference Prediction Value (RRPV). It should also be noted that whilst this ageing information is shown as forming one of the fields of the second part 105 of a cache line 100, and hence in one example implementation may be stored as part of the information within the TAG RAM, the ageing information can in other implementations be stored in any other suitable storage structure where it can be referenced by the eviction control circuitry when selecting victim cache lines.

FIG. 2B corresponds with the example of FIG. 2A, but shows an example where the cache line 100 stores data 150 within the first part 110 of the cache line. Within the second part 105 of the cache line, it can be seen that the metadata flag 140 has been given a value to identify that the cache line stores normal data. In this example it is assumed that a logic zero value is used for the metadata flag when normal data is stored in the cache line, whilst a logic one value is used when metadata is stored in the cache line, but it will be appreciated that the meaning of these different logic values can be swapped in an alternative implementation if desired. When a cache line stores data as shown in the example of FIG. 2B, then the AIV 145 will be updated in a standard manner in response to ageing increment events.

In the example of FIG. 2C, it is assumed that a cache line 100 stores a block of metadata 160 within the first part 110, and hence the metadata flag 140 takes a logic one value as shown. For a cache line that stores metadata, then as will be discussed in more detail later the AIV is updated in dependence on a dynamically adjusted ageing control value (also referred to herein as an ageing threshold value) determined by performance of the dynamic ageing operation by the dynamic metadata ageing circuitry 50.

As was discussed earlier, the tag value stored within the field 115 of the cache line 100 in the example of FIG. 2C may be derived from a trigger address associated with the access sequence identified by the block of metadata, the trigger address typically being the first address in the access sequence.

Figure 3:
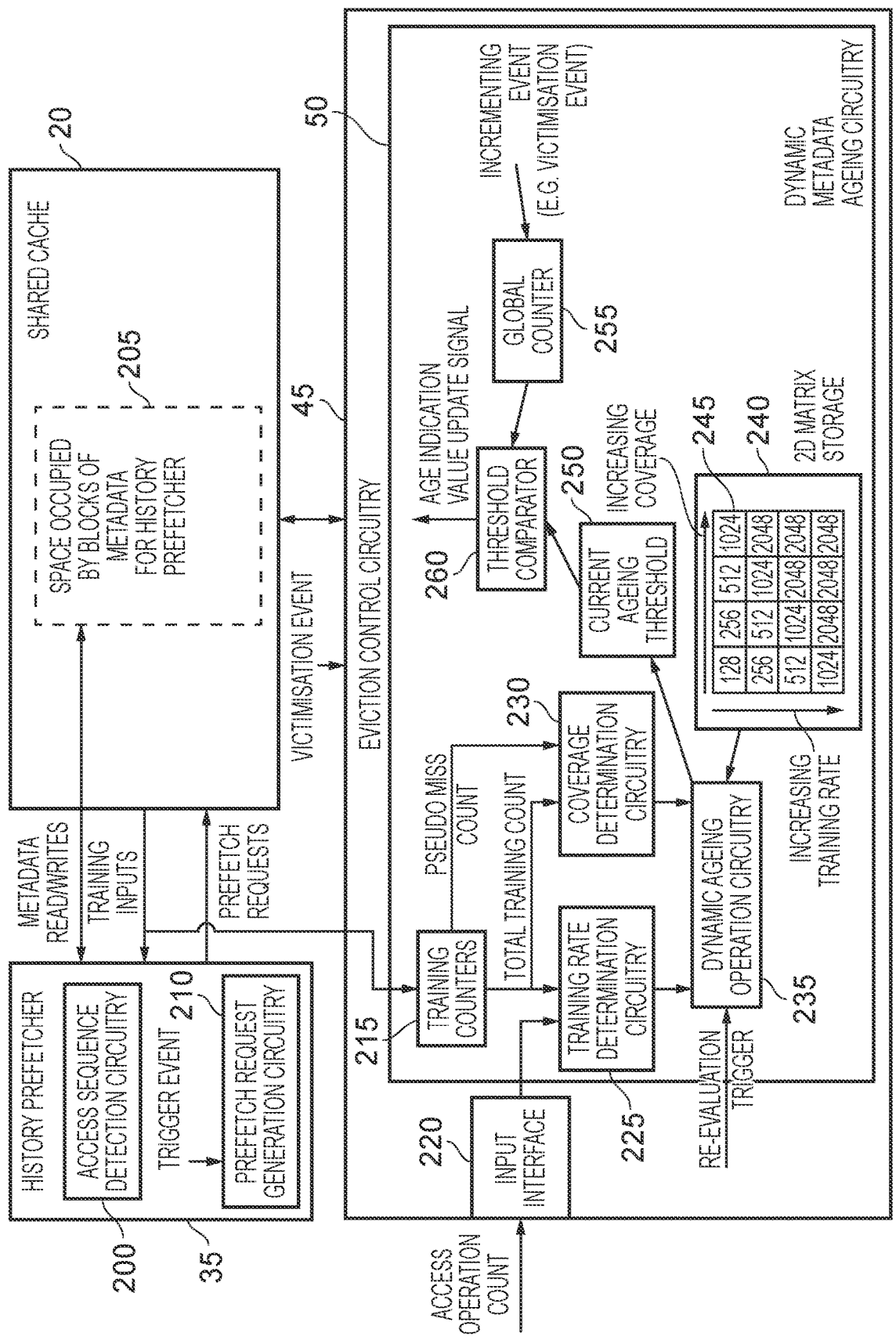
FIG. 3 is a block diagram illustrating in more detail the operation of the history prefetch circuitry and the eviction control circuitry of FIG. 1 in accordance with one example implementation.

FIG. 3 is a block diagram illustrating in more detail the operation of the history prefetch circuitry 35 and the eviction control circuitry 45 of FIG. 1 in accordance with one example implementation. The history prefetch circuitry 35 (also referred to herein as a history prefetcher) includes access sequence detection circuitry 200 for receiving training inputs from the cache 20 (in this example it being assumed that the cache is a shared cache accessible by more than one processing circuit), and for analysing those training inputs with the aim of seeking to detect one or more sequences of accesses being performed by the processing circuitry.

The training inputs can take a variety of forms, but in one example a training input is provided to the history prefetcher whenever processing of a demand access by the cache results in either a cache miss being detected, or a cache prefetch hit (pseudo miss) being detected for a cache line that has been prefetched due to the activities of the history prefetcher 35. Each training input will identify information about the associated cache miss or pseudo miss sufficient to enable the history prefetch circuitry to seek to detect, from analysis of a series of training inputs, patterns of accesses, and hence for example will typically include at least an indication of the memory address that has resulted in the miss or pseudo miss.

In some example implementations, it may also be the case that the history prefetcher 35 receives a training input when processing of a demand access by the cache results in a cache prefetch hit due to the activities of another prefetcher within the system. As will be apparent from the earlier discussion of FIG. 2A, the prefetch ID field 135 can be used to distinguish between the various prefetch circuits that have caused prefetching of the associated cache line to take place.

Once the history prefetcher 35 has detected an access sequence, then it can be arranged to generate a block of metadata used to identify that access sequence. For example, it may generate, in a compressed manner, an indication of the various addresses forming that access sequence and output that compressed information as the block of metadata. That block of metadata can then be written into the shared cache 20 for subsequent reference by the history prefetcher. As discussed earlier, the trigger address associated with the sequence of accesses can be used to determine where within the cache the metadata is stored (for example it may determine which set within a set associative cache is used, with one of the cache lines in that set then being employed to store the block of metadata). By such an approach, a hit within that cache line can later be detected when a demand access specifies the trigger address, this causing that block of metadata to be read from the cache and provided to the history prefetcher 35.

Such a hit on a metadata cache line within the cache is an example of a trigger event that is then used by prefetch request generation circuitry 210 within the history prefetcher 35 to determine one or more prefetch requests to be issued to the shared cache. In particular, the trigger event will cause a block of metadata to be read from the shared cache and then analysed by the prefetch request generation circuitry to determine the associated sequence of accesses, and in particular the various memory addresses associated with each access. This can then be used to generate a sequence of one or more prefetch requests that are sent to the shared cache, to request that data at the specified memory address or memory addresses is retrieved into the cache 20. As discussed earlier, this is done in anticipation that the processing circuitry will shortly be making a request for that data, and hence by prefetching the data into the cache this can cause a cache hit to occur when the subsequent demand access or demand accesses are received, whereas without the activity of the prefetch circuitry such demand accesses are more likely to have resulted in a miss.

Turning now to the eviction control circuitry 45, which as discussed earlier with reference to FIG. 1 includes dynamic metadata ageing circuitry 50, the eviction control circuitry has an input interface 220 for receiving a count value from the earlier-mentioned access operation counter 55 associated with the processing circuitry 10, this count value being an access operation count value indicative of the number of memory access operations performed by the processing circuitry since a counter initialisation event. This access operation count value is forwarded to training rate determination circuitry 225 within the dynamic metadata ageing circuitry 50. The dynamic metadata ageing circuitry 50 is also arranged to receive the training inputs forwarded to the history prefetch circuitry 35, and based on those training inputs is arranged to maintain a number of training counters 215. In one example implementation, the training counters 215 include a first counter providing a first training count value (also referred to herein as a total training count value) indicating a total number of training inputs received by the prefetch circuitry 35 since the earlier-mentioned counter initialisation event, and may also include a second counter providing a second training count value (also referred to herein as a pseudo miss count value) indicating a number of training inputs received by the prefetch circuitry 35 since the early-mentioned counter initialisation event that indicate a pseudo miss due to the activities of the prefetch circuitry 35.

The total count value is output to both the training rate determination circuitry 225 and coverage determination circuitry 230. The coverage determination circuitry 230 also receives the pseudo miss count value. The training rate determination circuitry 225 is arranged to determine the training rate indication by dividing the total training count value by the access operation count value. Further, the coverage determination circuitry 230 is arranged to determine a coverage indication by dividing the pseudo miss count value by the total training count value. Both the training rate indication and the coverage indication may be provided to dynamic ageing operation circuitry 235 used to perform the earlier-mentioned dynamic ageing operation upon occurrence of a re-evaluation trigger.

The re-evaluation trigger can take a variety of forms, but in one example occurs when the access operation count value reaches a given threshold, hence indicating that a certain number of access operations have been performed by the processing circuitry since the dynamic ageing operation was last performed.

Upon receipt of the re-evaluation trigger, the dynamic ageing operation circuitry 235 is arranged to use both the training rate indication from the training rate determination circuitry 225 and the coverage indication from the coverage determination circuitry 230 to perform a lookup within a two dimensional (2D) matrix 245 stored within 2D matrix storage 240. The 2D matrix 245 provides a matrix of ageing threshold values, each associated with a particular training rate indication and coverage indication. Based on the provided combination of training rate indication and coverage indication, the dynamic ageing operation circuitry 235 can hence lookup within the 2D matrix the appropriate ageing threshold value associated with that particular combination. Once the appropriate ageing threshold value has been determined from the 2D matrix, then that is used to update the current ageing threshold 250 that is provided to a threshold comparator 260.

The threshold comparator 260 also receives a global counter value maintained in global counter storage 255. The global counter is incremented each time an incrementing event is detected. In one example implementation, the incrementing event occurs whenever a victimisation event is processed by the eviction control circuitry 45. A victimisation event occurs when the eviction control circuitry is required to determine a victim cache line whose contents can be discarded/evicted, for example to make space for the storage of a new block of data or metadata within that victim cache line.

When a victimisation event is detected, the global counter within the storage 255 is incremented. The eviction control circuitry will then seek to identify a victim cache line from amongst one or more candidate victim cache lines. Exactly which cache lines are considered during this process will be dependent on the configuration of the cache, but considering by way of example a set associative cache, the eviction control circuitry will identify the set within which the victim cache line needs to be found, and then will determine whether the AIV associated with any cache line in that set meets a threshold ageing value that enables that cache line to be considered as a candidate victim cache line. If one or more of the cache lines has a suitable AIV, then the victim cache line will be chosen from those one or more cache lines. If none of the cache lines has a suitable AIV, then the cache lines in the set will be aged by incrementing their AIVs, but for any cache line in the set storing metadata that cache line will only be aged if the threshold comparator 260 determines that the global counter 255 has reached the current ageing threshold 250. Following the ageing process, then the eviction control circuitry will seek to identify a victim cache line. This process continues until a victim cache line has been successfully identified.

By such an approach, it can be seen that the rate at which cache lines storing metadata are aged can be varied dependent on the dynamic ageing operation performed by the dynamic ageing operation circuitry 235, and as a result the amount of space 205 within the cache 20 that is used to store blocks of metadata for use by the history prefetch circuitry 35 can be varied over time with the aim of seeking to improve the overall performance of the system.

Figure 4:
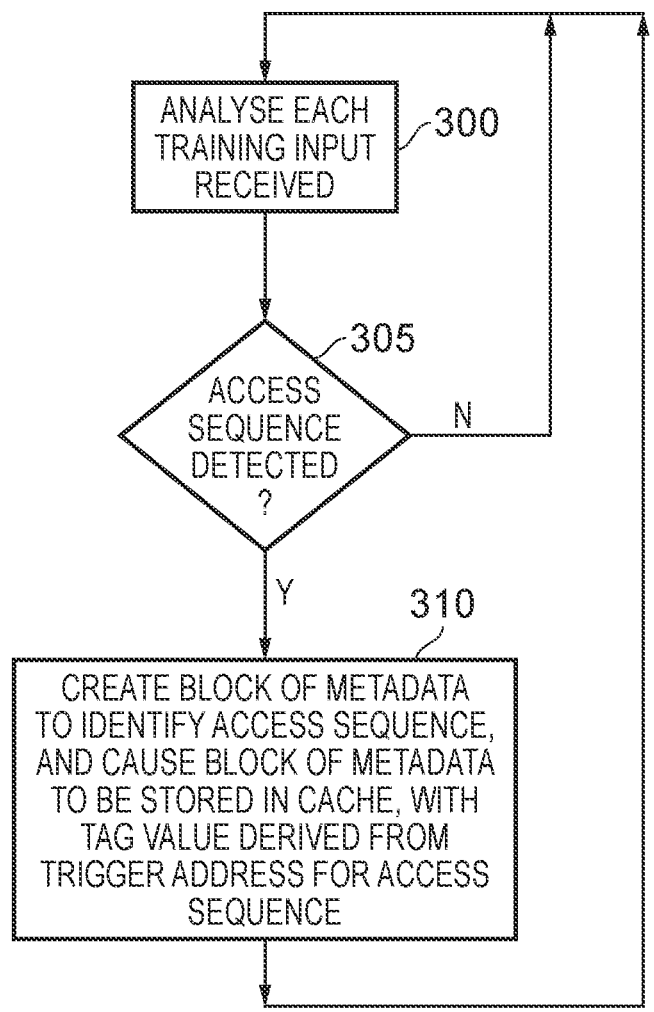
FIG. 4 is a flow diagram illustrating steps performed by the history prefetch circuitry in one example implementation in order to create blocks of metadata for identified access sequences.

FIG. 4 is a flow diagram illustrating the operation of the access sequence detection circuitry 200 within the history prefetch circuitry 35 of FIG. 3, in accordance with one example implementation. At step 300, each training input received is analysed, whereafter at step 305 it is determined whether an access sequence has been detected to a desired level of confidence. It will be appreciated that any of a number of known techniques can be used by the access sequence detection circuitry 200 to seek to detect particular access sequences, and to maintain a level of confidence indication if desired in association with each candidate access sequence that is being monitored.

If it is determined that an access sequence has not yet been detected to the desired level of confidence, then the process returns to step 300 to continue to monitor subsequent training inputs. However, once at step 305 an access sequence has been detected to a desired level of confidence, then the process proceeds to step 310, where a block of metadata is created to identify that access sequence, and the history prefetch circuitry 35 then causes that block of metadata be stored within the cache 20. As discussed earlier, in one example that block of metadata will be stored in the cache in association with a tag value that is derived from the trigger address of the access sequence. The process then returns to step 300 to continue to monitor further training inputs.

Figure 5A:
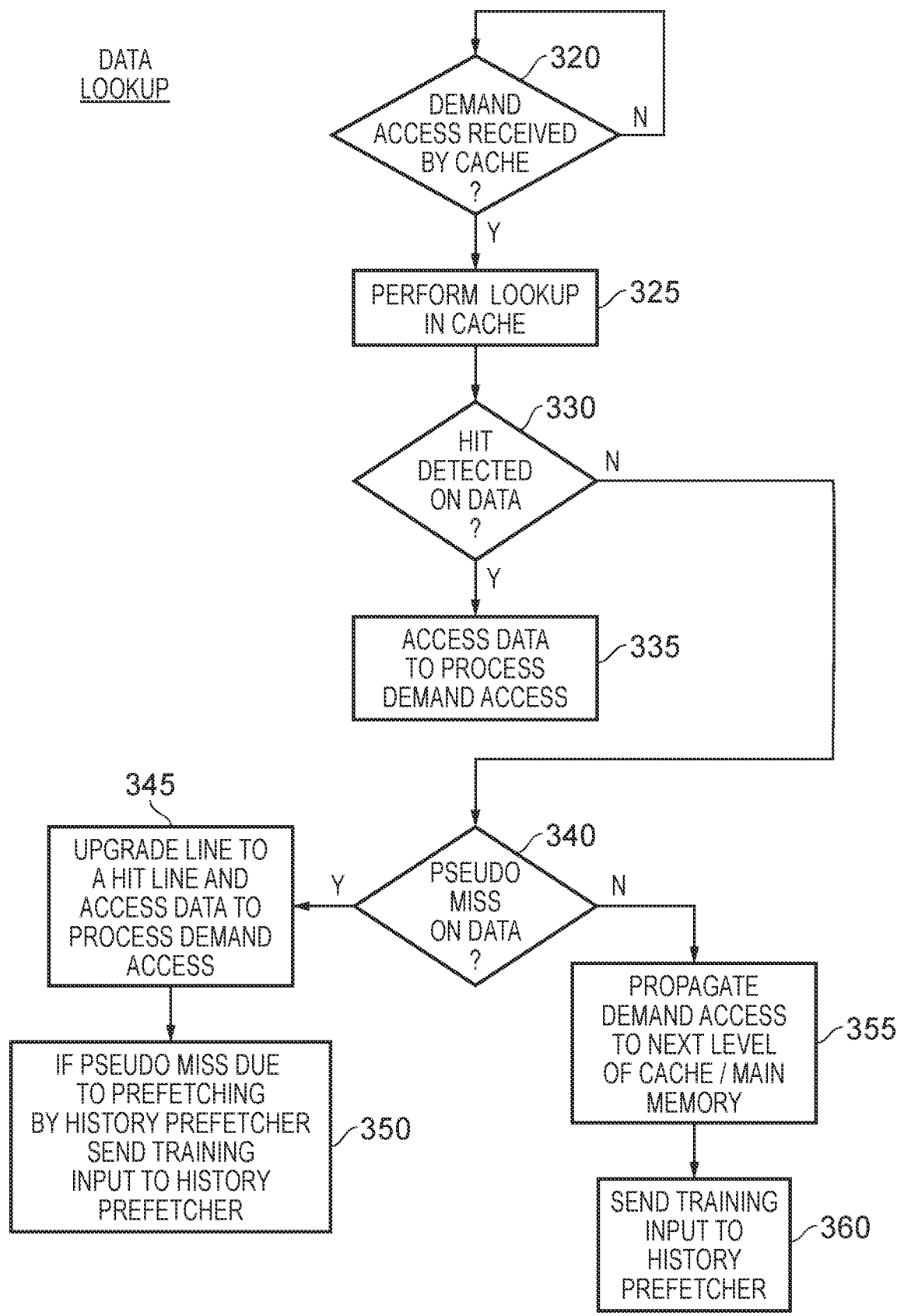
FIGS. 5A and 5B illustrate how lookup operations are performed within the cache in response to demand accesses received by the cache, in accordance with one example implementation.
Figure 5B:
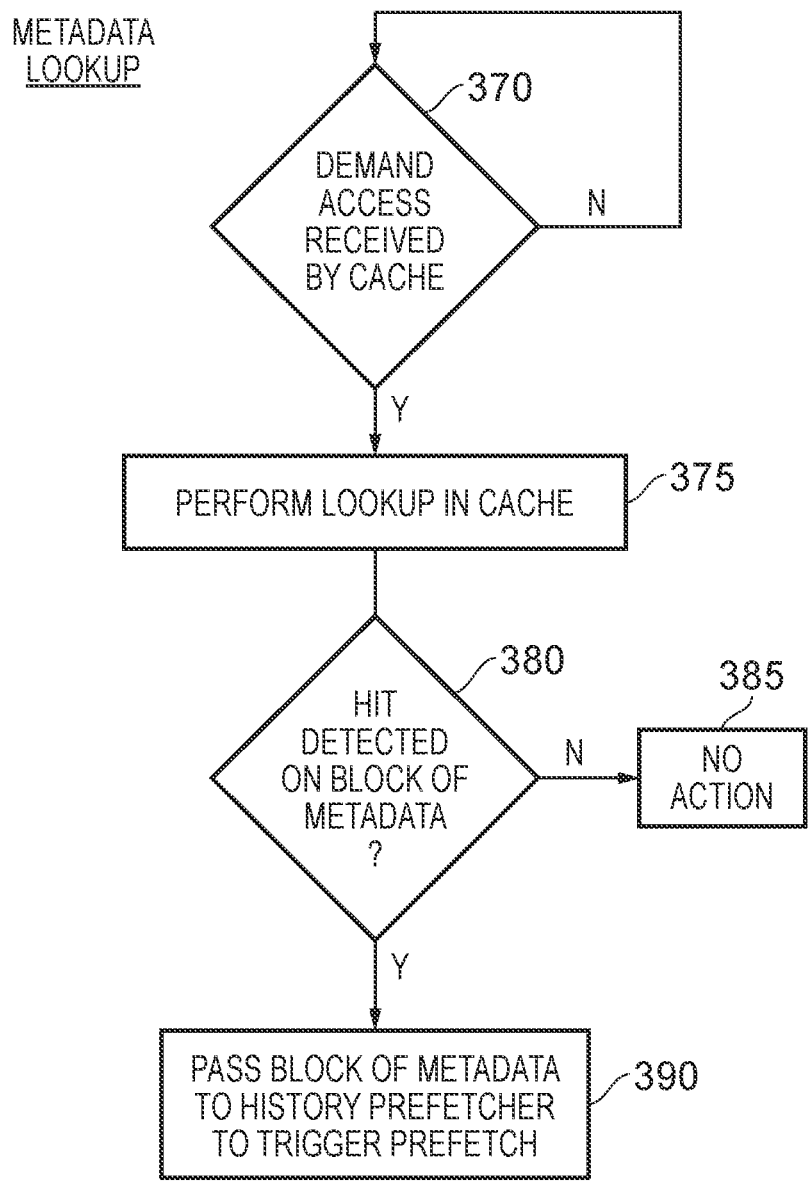

FIGS. 5A and 5B illustrate a data lookup process performed within the cache upon receipt of a demand access. FIG. 5A illustrates a lookup performed to detect whether data required by the processing circuitry is present or not within the cache, whilst FIG. 5B illustrates a lookup performed to determine whether metadata is stored within the cache for a memory address specified by the demand access. While shown as separate figures, it will be appreciated that these lookups could be performed together, and that the data and metadata pipeline access could for example be fully parallelised.

Considering first FIG. 5A, then upon receipt of a demand access by the cache at step 320, a lookup is performed in the cache at step 325, whereafter it is determined at step 330 whether a hit has been detected on data 25 stored within the cache. If so, then that data can be accessed within the cache in order to process the demand access at step 335. For example, in the event of a read access, the required data can be retrieved from the cache and returned to the processing circuitry, whilst in the event of a write access, the data provided within the demand access can be used to update the contents of the hit cache line. In the event of write to a write back region of memory, the dirty bit may be set within the cache line to identify that the contents of the cache line are now more up-to-date than memory, whereas for a write through region of memory, the demand access may be propagated on to the lower levels of cache/main memory, in addition to performing an update of the contents of the cache line. Depending on the replacement policy used, the detection of a hit for a cache line may cause the associated AIV to be reset to its lowest value to indicate that the cache line contents should be treated as new, with the ageing process then restarting for those cache line contents.

If a hit is not detected, then the process proceeds to step 340 where it is determined whether there is been a pseudo miss (i.e. a cache prefetch hit) in the cache. Such a scenario indicates that there has been a first hit on a cache line that has been prefetched. As with the situation for a hit at step 330, then depending on the replacement policy used the detection of a pseudo miss for a cache line may cause the associated AIV to be reset to its lowest value. As indicated in FIG. 5A, if a pseudo miss is detected, then the process proceeds to step 345 where the cache line is upgraded to a hit line by clearing the earlier-discussed prefetch flag 130 for the cache line, and the access is allowed to proceed to that cache line in order to process the demand access. Further, at step 350, if the pseudo miss was due to prefetching by the history prefetch circuitry 35, then a training input is generated for sending to the history prefetch circuitry to identify that a pseudo miss has occurred due to its prefetching activity. As mentioned earlier, in some implementations it may also be the case that the history prefetch circuitry 35 can perform some training based on prefetch activity of other prefetch circuits, and in that event at step 350 the history prefetch circuitry may also receive a training input for a pseudo miss that has occurred due to the prefetching activity of another prefetch circuit.

If a pseudo miss on the data is not detected at step 340, then at step 355 the demand access is propagated to the next level of cache or main memory, and at step 360 a training input is sent to the history prefetch circuitry to identify that a miss has occurred.

FIG. 5B illustrates the lookup performed in respect of metadata held within the cache. When a demand access is received by the cache at step 370, a lookup is performed in the cache at step 375, whereafter it is determined at step 380 whether a hit has been detected on a block of metadata. As discussed earlier, this may for example be the case where the memory address specified by the demand access matches the trigger address associated with the access sequence identified by the block of metadata. If no hit is detected at step 380, then no further action is required, as indicated by the step 385. However, in the event of a hit, then the block of metadata is passed to the history prefetcher 35 at step 390 in order to trigger the generation of one or more prefetch requests. As with the situation for a hit at step 330 of FIG. 5A, then depending on the replacement policy used the detection of a hit at step 380 for a cache line may cause the associated AIV to be reset to its lowest value.

Figure 6:
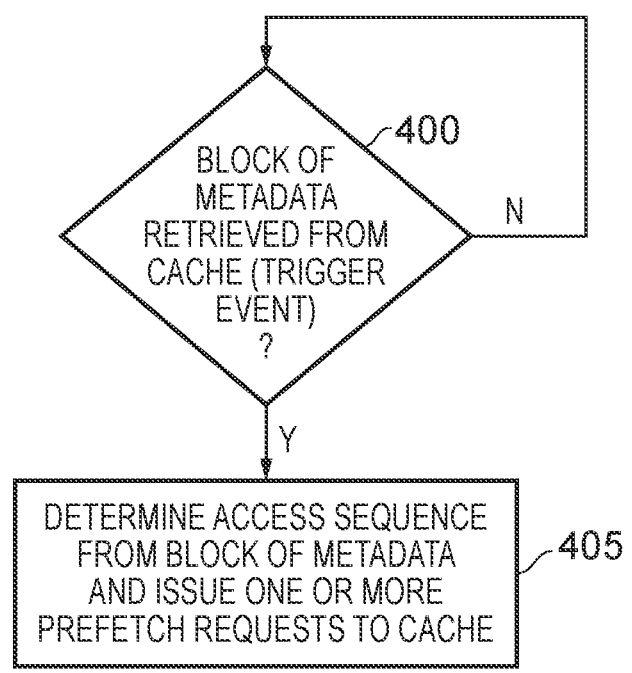
FIG. 6 is a flow diagram illustrating how blocks of metadata stored within the cache may later be used by the history prefetch circuitry to generate prefetch requests, in accordance with one example implementation.

FIG. 6 is a flow diagram schematically illustrating steps performed by the prefetch request generation circuitry 210 of the history prefetch circuitry 35 in one example implementation. At step 400, it is determined whether a block of metadata has been retrieved from the cache, this being interpreted by the prefetch request generation circuitry 210 as a trigger event. Once the trigger event has been detected, then the process proceeds to step 405 where the prefetch request generation circuitry 210 determines the access sequence identified by the block of metadata, in order for example to determine the various memory addresses associated with the sequence of accesses, and then issues one or more prefetch requests to the cache 20 in order to request that the data associated with one or more of those memory addresses is pre-prefetched into the cache.

It should be noted that in one example implementation the cache is not required to respond to prefetch requests, and will typically give priority to demand access requests. In particular, failure to respond to a prefetch request does not result in any errors in behaviour, but merely may impact performance. However, assuming memory bandwidth is available, the cache can be arranged to issue the prefetch requests to a lower level of cache/main memory in order to retrieve into the cache the data associated with the memory addresses identified by those prefetch requests (assuming it determines that the data requested to be prefetched is not already in the cache).

Figure 7:
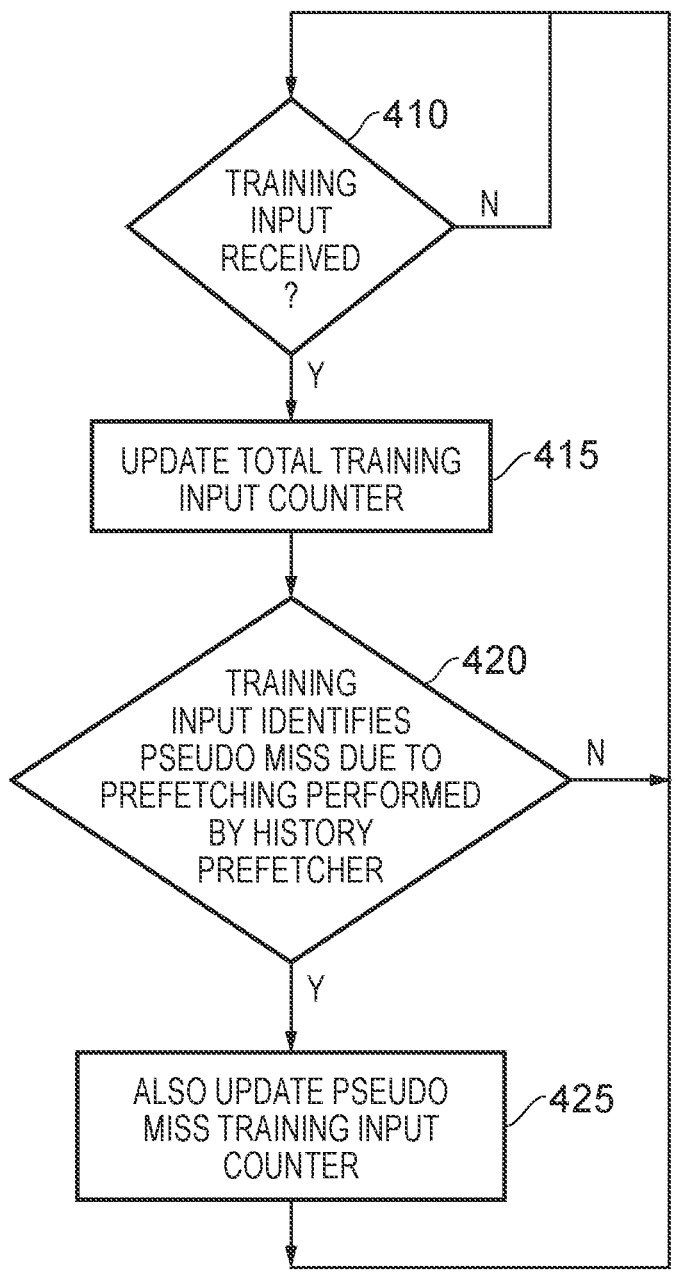
FIG. 7 is a flow diagram illustrating how various training input counters may be updated in accordance with one example implementation.

FIG. 7 is a flow diagram illustrating how the training counters 215 are updated in accordance with one example implementation. At step 410, it is determined whether a training input has been received, and if so then at step 415 the total training input counter value is updated (e.g. incremented). At step 420 it is then determined whether that training input identifies a pseudo miss due to prefetching performed by the history prefetcher. If not, then no further action is required and the process returns to step 410 to await the next training input. However, if the training input does identify such a pseudo miss, then the process proceeds to step 425 where the pseudo miss training input counter value is also updated (e.g. incremented), prior to the process returning to step 410.

Figure 8:
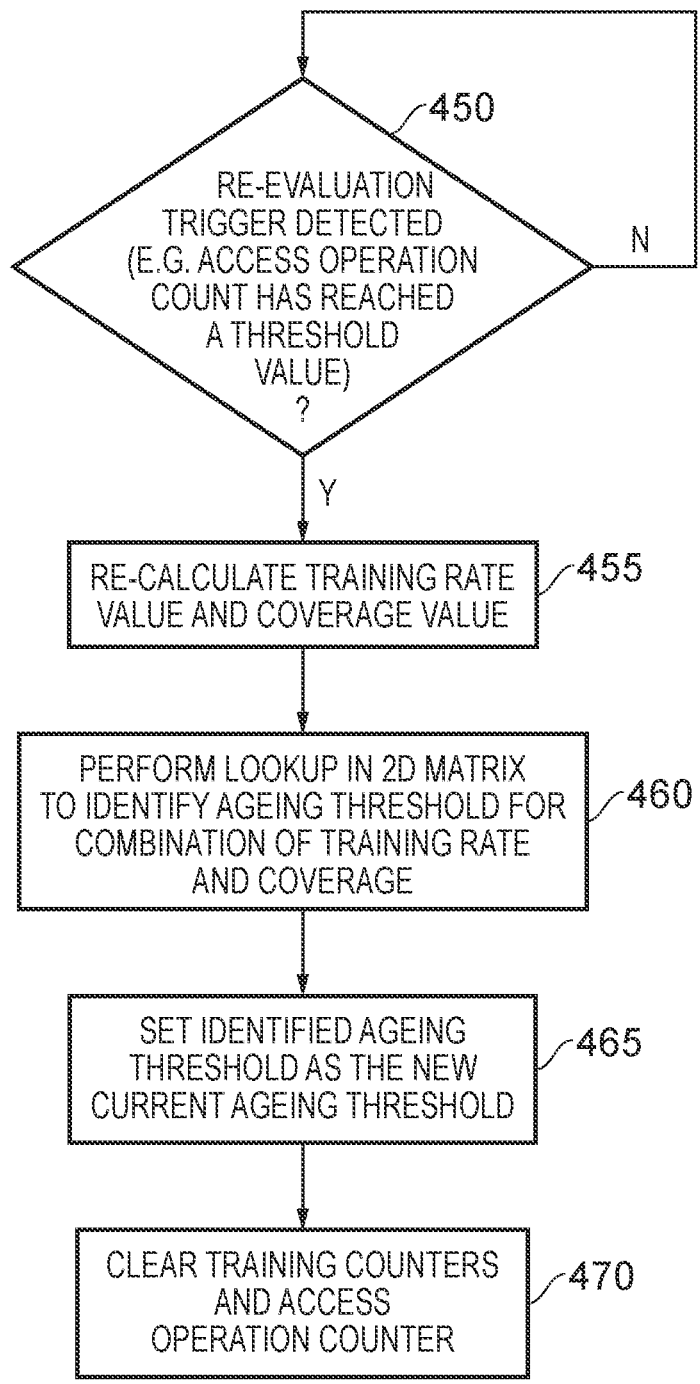
FIG. 8 is a flow diagram illustrating steps performed upon receipt of a re-evaluation trigger in order to re-evaluate an ageing threshold used to control ageing of blocks of metadata stored in the cache, in accordance with one example implementation.

FIG. 8 is a flow diagram illustrating the operation of the dynamic metadata ageing circuitry 50 upon receipt of a re-evaluation trigger. As mentioned earlier, in one example implementation the re-evaluation trigger is detected when the access operation count value received by the input interface 220 of the eviction control circuitry 45 has reached a determined threshold value.

When the re-evaluation trigger is detected at step 450, the process proceeds to step 455, where the training rate indication value and coverage indication value are re-calculated by the training rate determination circuitry 225 and coverage determination circuitry 230, respectively. Whilst in one example implementation the training rate determination circuitry 225 and coverage determination circuitry 230 could be triggered to perform their re-calculations in response to the re-evaluation trigger, in an alternative implementation they may be arranged to continuously evaluate their inputs, and hence at any point in time may be outputting a current training rate indication and coverage indication, respectively, that can be used by the dynamic ageing operation circuitry 235 upon detection of the re-evaluation trigger.

At step 460, the dynamic ageing operation circuitry 235 is arranged to perform a lookup within the 2D matrix 245 to identify an ageing threshold, based on the combination of training rate indication and coverage indication received by the dynamic ageing operation circuitry 235. Then, at step 465, the identified ageing threshold is set as the new current ageing threshold 250. At step 470, the training counters and access operation counter are in one example implementation cleared, so as to initiate a new counting period.

Figure 9:
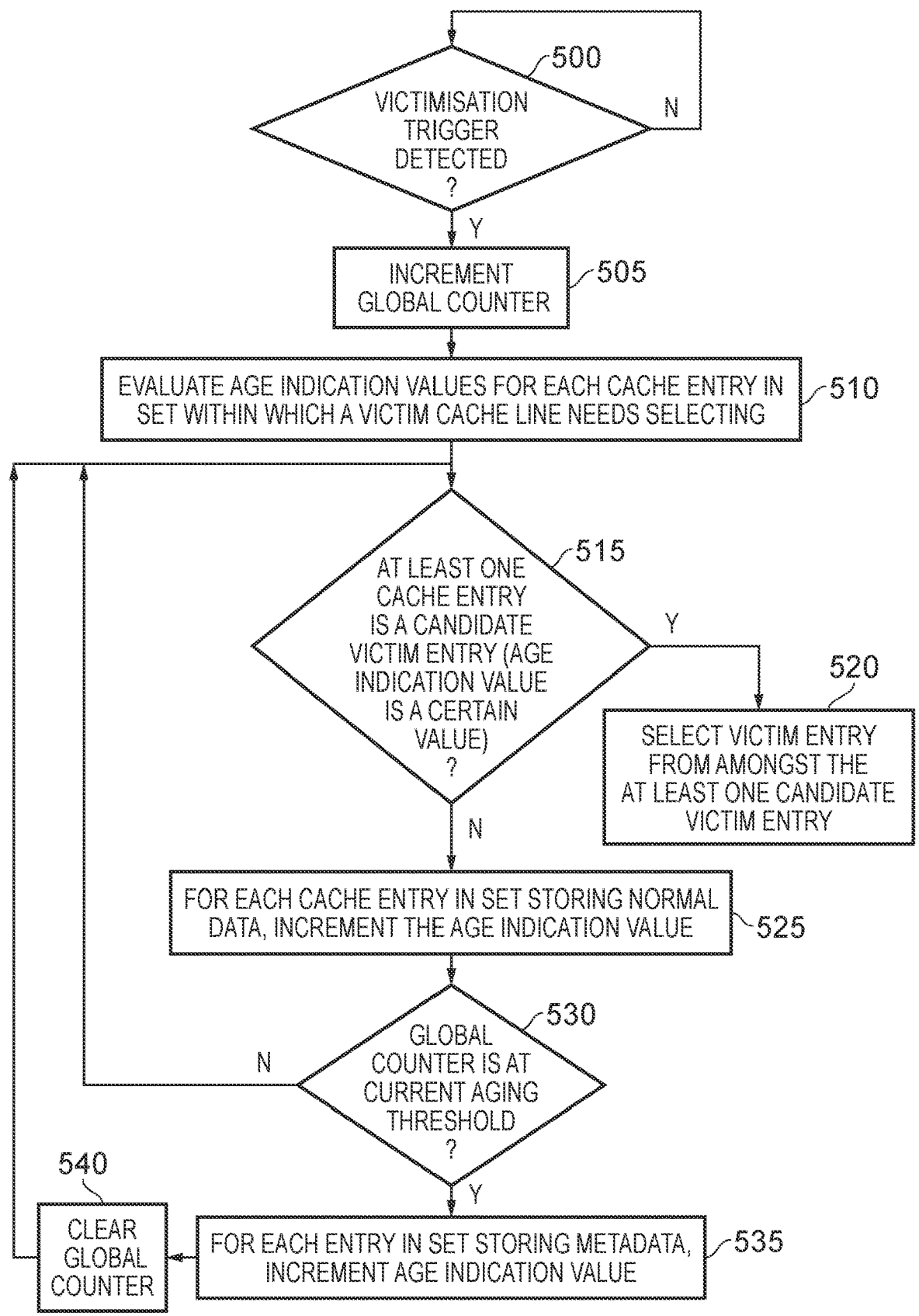
FIG. 9 is a flow diagram illustrating steps performed upon detection of a victimisation trigger, in accordance with one example implementation.

FIG. 9 is a flow diagram illustrating steps performed by the eviction control circuitry 45 in response to receipt of a victimisation event, such a victimisation event causing the eviction control circuitry to seek to select a victim cache entry whose contents can be discarded, and if necessary evicted, for example to free up space within the cache for the storage of new data or metadata. At step 500 it is determined whether a victimisation trigger has been detected, and if so the process proceeds to step 505 where the global counter 255 is incremented.

At step 510, each of the possible cache lines from which the victim cache line could be selected are evaluated, and in particular the AIV of each such cache line is reviewed. Hence, in the example of a set associative cache structure, the set from which the victim cache line needs to be chosen will be identified, and then each of the cache lines in the set will be evaluated at step 510.

At step 515, it is determined whether there is at least one cache line amongst those considered at step 510 that is a candidate victim cache line. In one example implementation, a cache line will only be considered a candidate victim cache line if its AIV has reached a predetermined value, and hence that cache line is considered to have been aged to a point where it can now be considered for eviction. If at step 515 there is at least one candidate victim cache line identified, then the process proceeds to step 520 where the victim cache line is selected from amongst the one or more candidate victim cache lines.

However, if at step 515 it is determined that none of the possible cache lines can be considered to be a candidate victim cache line, then at step 525, for each cache line in the set that stores normal data, the AIV is incremented. However, the AIV for any cache line in the set that stores metadata is not automatically incremented at this point, and instead whether the AIV for such a cache line is incremented is dependent on the global counter. In particular, at step 530 it is determined by the threshold comparator 260 whether the global counter 255 has yet reached the current ageing threshold 250. If not, then the process merely returns step 515, but if the global counter has reached the current ageing threshold, then at step 535 each entry in the set that stores metadata has its AIV incremented. Thereafter, at step 540 the global counter is cleared prior to the process returning to step 515. By repeating the process shown in FIG. 9, then this will cause a victim cache line to be selected at step 520.

FIGS. 10A to 10D schematically illustrates various example use cases where the present technique can be employed. These figures illustrate schematically the state of accesses to the cache 20 that result from processing of demand access requests. Hence, the dotted box 560 represents the states for the totality of those accesses, the dotted box 555 illustrates the proportion that result in either a miss, or a pseudo miss due to activities of the history prefetcher, the box 565 illustrates the proportion that result in a pseudo miss due to the activities of the history prefetcher, and the box 570 illustrates the proportion that result in pseudo misses due to the activities of other prefetch circuits provided within the system. The area within the dotted box 560 that is not covered by one of the other boxes 555, 565, 570 indicates the proportion of demand accesses that result in a hit within the cache.

Figure 10A:
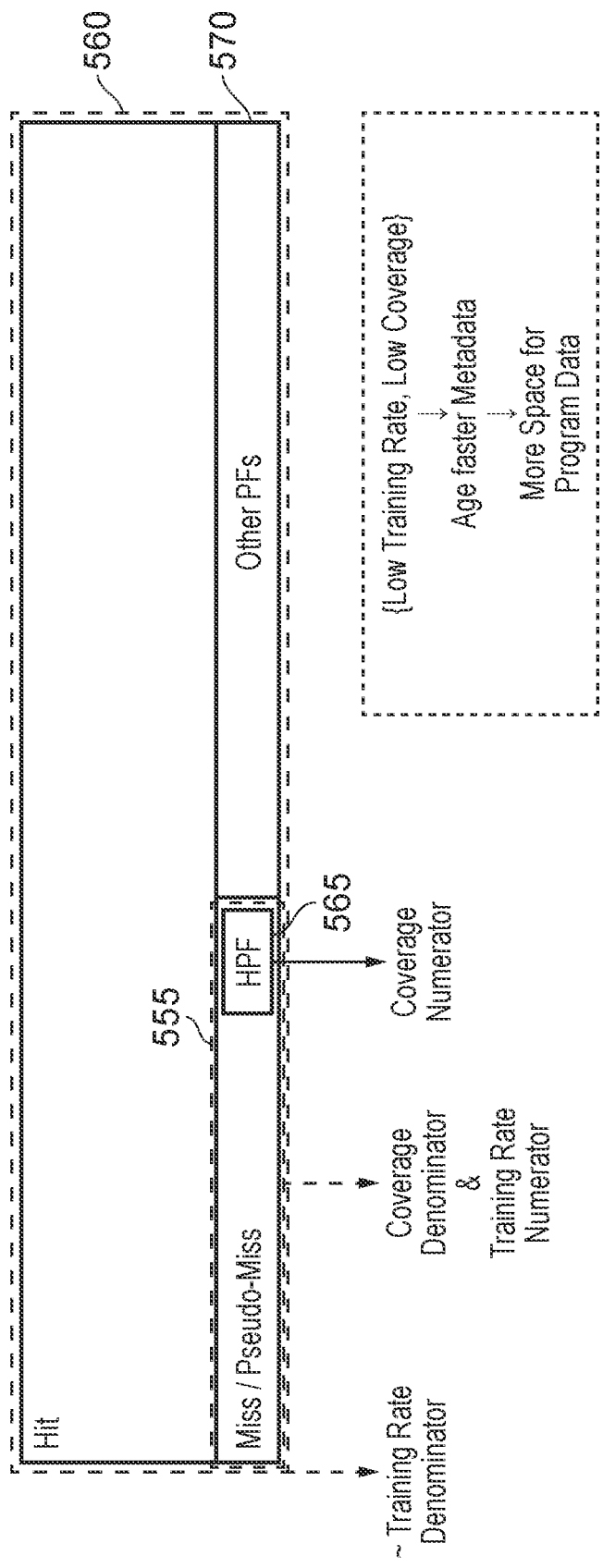
FIGS. 10A to 10D schematically illustrate various example use cases where the present technique can be employed.

In the first example use case of FIG. 10A, it is assumed that the dataset processed by the processing circuitry fits comfortably within the cache, and hence the demand accesses issued as a result of the activities of the processing circuitry typically hit in the cache. In one example implementation, the training rate indication may be determined by dividing the proportion 555 by the total 560. As will be apparent from the earlier discussion, the denominator for the computation of the training rate indication may actually be the access operation counter value provided by the access operation counter 55, but the total 560 can be viewed as an approximation of that value for these purposes. This is particularly true if there is no intervening level cache 15 provided between the processing circuitry 10 and the cache 20, as the access operations performed by the processing circuitry will result in corresponding demand accesses being issued to the cache 20. In the event of there being an intervening level cache 15, some of the demand accesses issued by the processing circuitry may result in hits been detected in the intervening level cache, and as a result the number of demand accesses forwarded to the cache 20 will reduce and the total 560 will be slightly lower than the total indication of the number of access operations performed by the processing circuitry.

Also, in this example it is assumed that the history prefetch circuitry 35 does not receive training inputs as a result of pseudo misses due to the activities of other prefetch circuits, and hence the proportion 570 is not included within the numerator for the training rate, and instead the proportion 555 is used as the training rate numerator. However, in an alternative implementation where the prefetch circuitry is arranged to receive training inputs as a result of pseudo misses due to the activities of one or more other prefetch circuits, then those training inputs could also be included in the training rate numerator.

Considering now the coverage indicator, this can be determined by dividing the proportion 565 by the proportion 555.

As will be apparent in the example of FIG. 10A, the training rate is relatively low, as is the coverage, and this will cause the dynamic ageing operation to select a relatively low ageing threshold when accessing the 2D matrix 245. As a result, this will cause the metadata to age faster, thereby freeing up a greater proportion of the cache 20 for the storage of data 25 for use by the processing circuitry (such data being referred to in FIGS. 10A to 10D as the program data).

Figure 10B:
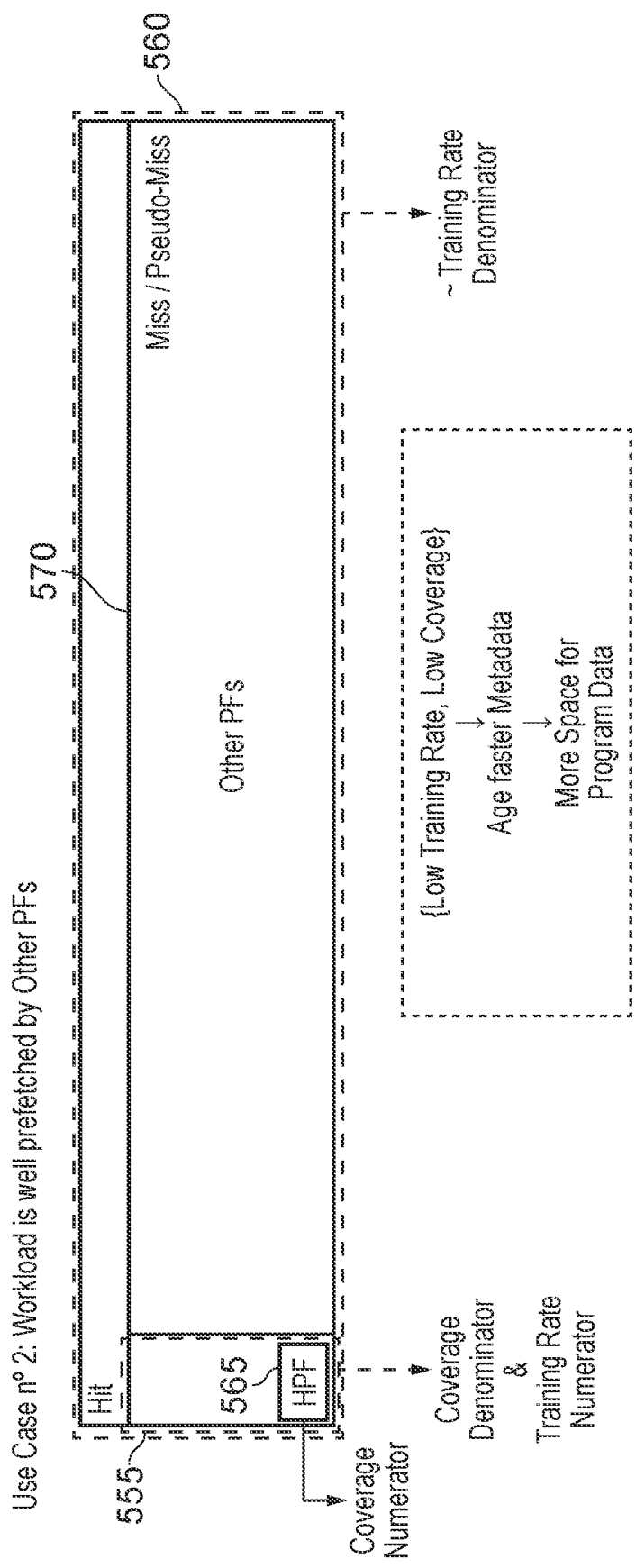

FIG. 10B illustrates another use case where the workload required by the processing circuitry is prefetched very effectively by other prefetch circuits within the system, whereas the activities of the history prefetcher are not as useful. As a result, it can be seen that the proportion of pseudo misses resulting from the activities of the other prefetchers indicated by the box 570 is relatively large. Again, in this example it will be seen that the training rate is relatively low, as is the coverage, and hence again a relatively low ageing threshold will be chosen that will cause the metadata to age faster. Hence this results in more space becoming available within the cache for the program data.

Figure 10C:
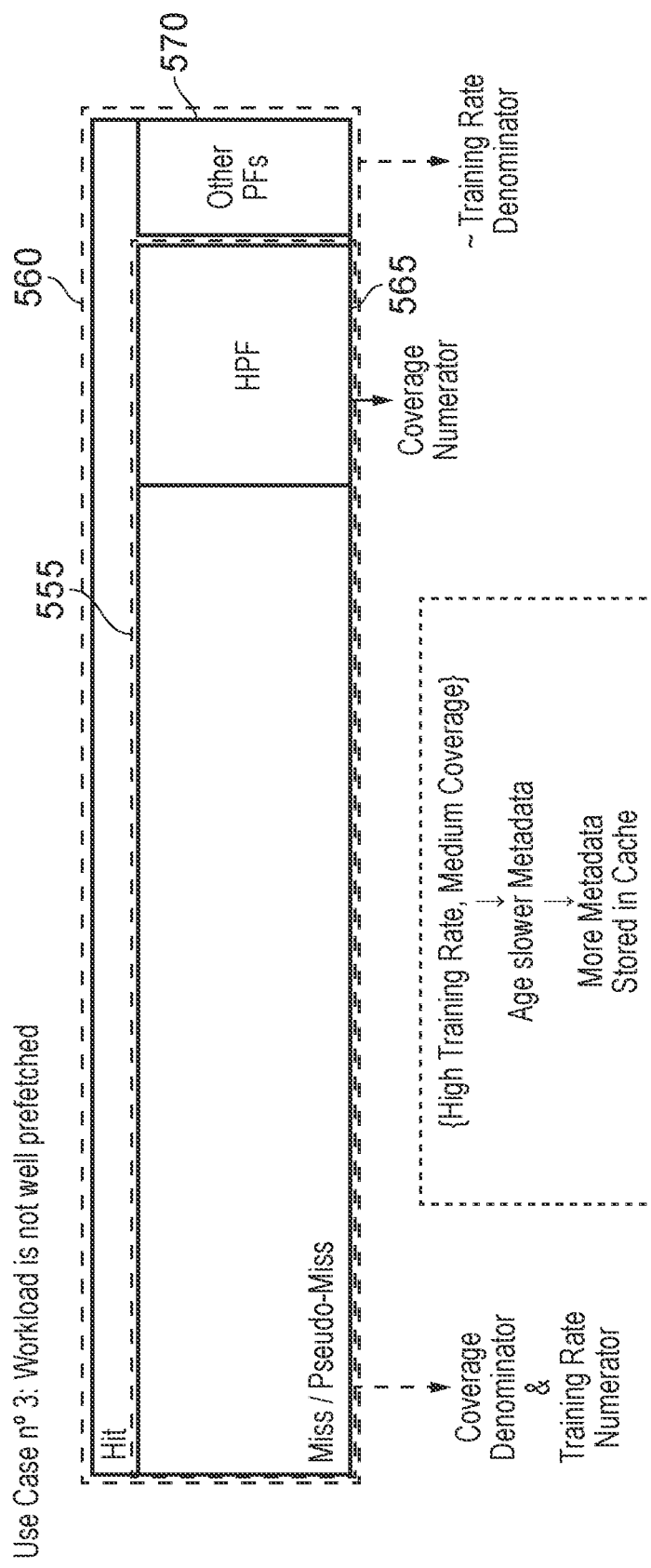

FIG. 10C illustrates a further use case where the data required by the processing circuitry when performing its workload is not prefetched very effectively by any prefetch circuits, and accordingly there are a high proportion of misses within the cache. In this example, it can be seen that the training rate is relatively high due to the dotted box 555 covering a large proportion of the total 560, and the coverage is at a medium level. As a result, the dynamic ageing operation will cause a higher ageing threshold to be selected than would be the case for the examples of FIG. 10A or 10B, and hence the metadata will age more slowly, allowing a greater amount of metadata to be stored within the cache than would be the case for the examples of FIGS. 10A and 10B.

Figure 10D:
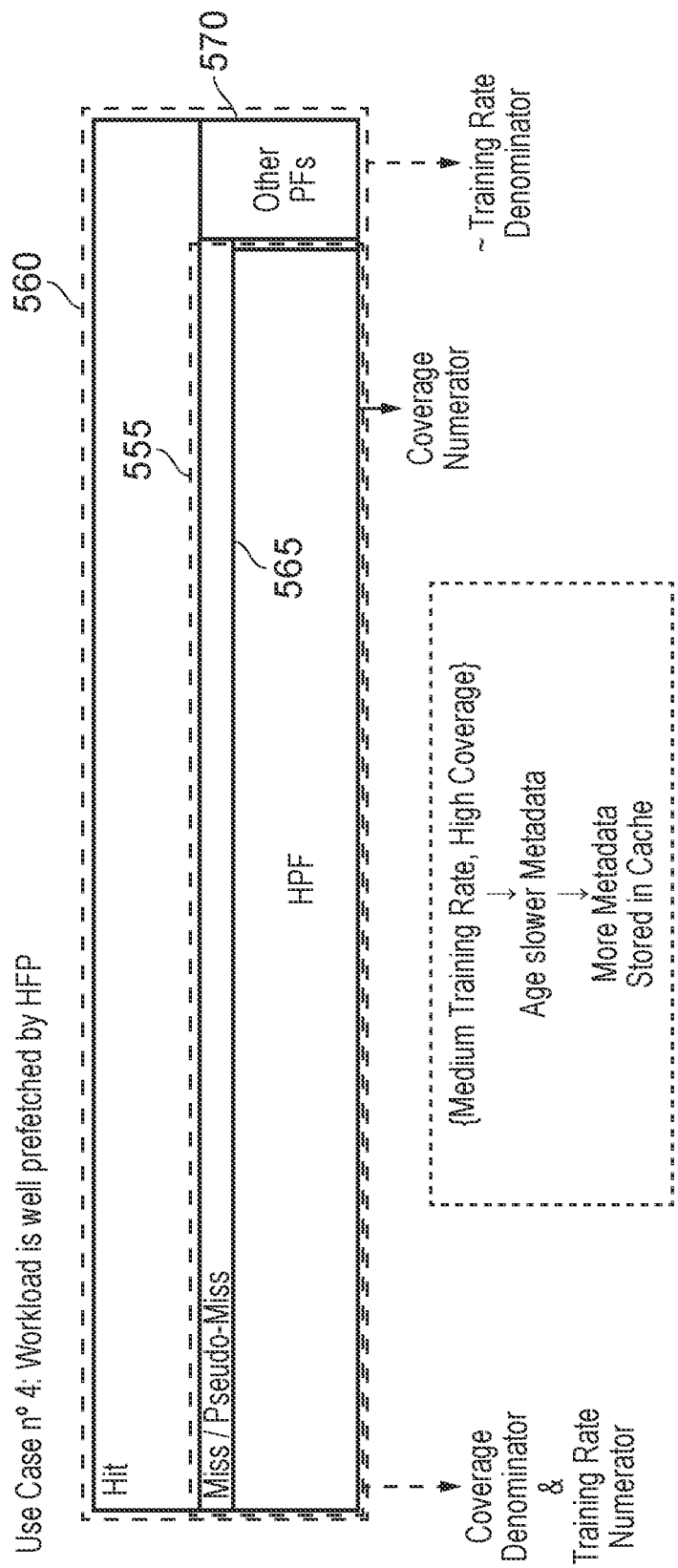

Finally, FIG. 10D illustrates a further example use case where the data required by the processing circuitry when performing its workload is prefetched very well by the activities of the history prefetch circuitry, and hence the box 565 is relatively large. In this example, there is a medium training rate indication and a high coverage indication, and again this will cause a relatively high ageing threshold to be selected, causing the metadata to age more slowly, and hence for more metadata to be stored within the cache.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. The code may comprise a myHDL representation which is subsequently compiled into a Verilog representation. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally, or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively, or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively, or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

From the above description, it will be seen that the techniques described herein provide a mechanism for dynamically adjusting the ageing of metadata stored within the cache so as to seek to improve performance within the system. In particular, a training rate indication can be determined, and optionally also a coverage indication can be determined, and these indications can be used as a useful indicator of the bandwidth that should be reserved for history prefetching activities and the usefulness of the associated metadata that is occupying cache lines within the cache. As a result of using these indications to dynamically alter an ageing threshold used in association with cache lines storing blocks of metadata, that metadata can be aged more appropriately dependent on a variety of factors such as the processing activities being performed by the processing circuitry and the effectiveness of the prefetching activities being performed by the history prefetch circuitry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
prefetch circuitry; and
a cache having a plurality of entries to store data for access by processing circuitry and blocks of metadata for reference by the prefetch circuitry;
wherein:
the prefetch circuitry is arranged to detect one or more access sequences in dependence on training inputs derived from demand accesses processed by the cache in response to memory access operations performed by the processing circuitry and, on detecting a given access sequence, to cause an associated given block of metadata providing information indicative of the given access sequence to be stored in a selected entry of the cache;
the apparatus further comprising:
eviction control circuitry, responsive to a victimisation event, to perform an operation to select a victim entry in the cache, the victim entry being selected from one or more candidate victim entries;
wherein each entry has an associated age indication value used to determine whether that entry is allowed to be a candidate victim entry, the eviction control circuitry is arranged to perform a dynamic ageing operation to determine an ageing control value used to control updating of the associated age indication value for any entry storing a block of metadata, and the dynamic ageing operation is arranged to determine the ageing control value in dependence on at least a training rate indication for the prefetch circuitry, where the training rate indication is indicative of a number of training inputs per memory access operation performed by the processing circuitry.

2. An apparatus as claimed in claim 1, wherein the prefetch circuitry is arranged, responsive to a trigger event causing the associated given block of metadata to be retrieved from the cache, to determine from the given access sequence one or more prefetch requests to be issued to request the prefetching of data into one or more entries of the cache in anticipation of access to that data being sought by at least one future demand access.

3. An apparatus as claimed in claim 1, wherein the dynamic ageing operation performed by the eviction control circuitry is arranged to determine the ageing control value in dependence on both the training rate indication for the prefetch circuitry and a coverage indication for the prefetch circuitry, where the coverage indication is indicative of a proportion of the demand accesses processed by the cache for which the data to be accessed in response to the demand accesses is present in the cache due to prefetching activity of the prefetch circuitry.

4. An apparatus as claimed in claim 3, wherein:
the prefetch circuitry is arranged to receive a training input each time a demand access processed by the cache results in a cache miss, or results in a cache prefetch hit due to prefetching performed in a response to a prefetch request issued by the prefetch circuitry; and
the eviction control circuitry comprises training counter circuitry to maintain a first training count value indicating a total number of training inputs received by the prefetch circuitry since a counter initialisation event, and a second training count value indicating a number of training inputs received by the prefetch circuitry indicating a cache prefetch hit since the counter initialisation event.

5. An apparatus as claimed in claim 4, wherein the eviction control circuitry comprises coverage determination circuitry to determine the coverage indication by dividing the second training count value by the first training count value.

6. An apparatus as claimed in claim 3, wherein:
the eviction control circuitry is arranged to perform the dynamic ageing operation to select, as the ageing control value, an ageing threshold value in dependence on both the training rate indication and the coverage indication.

7. An apparatus as claimed in claim 6, wherein the eviction control circuitry has access to a two dimensional array of predetermined ageing threshold values, and is arranged to select from the two dimensional array one of the predetermined ageing threshold values based on both the training rate indication and the coverage indication.

8. An apparatus as claimed in claim 1, wherein the eviction control circuitry comprises training counter circuitry to maintain a training count value indicating a number of training inputs received by the prefetch circuitry since a counter initialisation event.

9. An apparatus as claimed in claim 8, wherein the prefetch circuitry is arranged to receive a training input each time a demand access processed by the cache results in a cache miss, or results in a cache prefetch hit due to prefetching performed in response to a prefetch request issued by the prefetch circuitry.

10. An apparatus as claimed in claim 8, wherein:
the eviction control circuitry has an input interface to receive an indication of a number of memory access operations performed by the processing circuitry since the counter initialisation event; and
the eviction control circuitry comprises training rate determination circuitry to determine the training rate indication by dividing the training count value by the indication of the number of memory access operations performed by the processing circuitry.

11. An apparatus as claimed in claim 10, wherein the eviction control circuitry is arranged to perform the dynamic ageing operation to re-determine the ageing control value each time a re-evaluation trigger is detected, and the re-evaluation trigger is detected when the indication of the number of memory access operations performed by the processing circuitry as received at the input interface reaches a predetermined value.

12. An apparatus as claimed in claim 11, wherein the counter initialisation event occurs in response to re-determination of the ageing control value.

13. An apparatus as claimed in claim 1, wherein the eviction control circuitry is arranged to perform the dynamic ageing operation to re-determine the ageing control value each time a re-evaluation trigger is detected.

14. An apparatus as claimed in claim 1, wherein the eviction control circuitry is arranged to perform the dynamic ageing operation to select, as the ageing control value, an ageing threshold value in dependence on at least the training rate indication for the prefetch circuitry.

15. An apparatus as claimed in claim 14, further comprising a global ageing counter that is incremented each time an incrementing event is detected, and an update of the associated age indication value of an entry storing a block of metadata is inhibited unless the global ageing counter has reached the ageing threshold value.

16. An apparatus as claimed in claim 15, wherein the incrementing event is detected each time the victimisation event is detected.

17. A method of controlling use of a cache to store blocks of metadata for reference by prefetch circuitry, comprising:
arranging the cache to have a plurality of entries to store data for access by processing circuitry and the blocks of metadata for reference by the prefetch circuitry;
employing the prefetch circuitry to detect one or more access sequences in dependence on training inputs derived from demand accesses processed by the cache in response to memory access operations performed by the processing circuitry and, on detecting a given access sequence, to cause an associated given block of metadata providing information indicative of the given access sequence to be stored in a selected entry of the cache;
responsive to a victimisation event, employing eviction control circuitry to perform an operation to select a victim entry in the cache, the victim entry being selected from one or more candidate victim entries, each entry having an associated age indication value used to determine whether that entry is allowed to be a candidate victim entry; and
performing a dynamic ageing operation to determine an ageing control value used to control updating of the associated age indication value for any entry storing a block of metadata, and the dynamic ageing operation determining the ageing control value in dependence on at least a training rate indication for the prefetch circuitry, where the training rate indication is indicative of a number of training inputs per memory access operation performed by the processing circuitry.

18. A non-transitory computer-readable medium to store computer-readable code for fabrication of an apparatus comprising:

prefetch circuitry; and a cache having a plurality of entries to store data for access by processing circuitry and blocks of metadata for reference by the prefetch circuitry;

wherein:

the prefetch circuitry is arranged to detect one or more access sequences in dependence on training inputs derived from demand accesses processed by the cache in response to memory access operations performed by the processing circuitry and, on detecting a given access sequence, to cause an associated given block of metadata providing information indicative of the given access sequence to be stored in a selected entry of the cache;

the apparatus further comprising:

eviction control circuitry, responsive to a victimisation event, to perform an operation to select a victim entry in the cache, the victim entry being selected from one or more candidate victim entries;

wherein each entry has an associated age indication value used to determine whether that entry is allowed to be a candidate victim entry, the eviction control circuitry is arranged to perform a dynamic ageing operation to determine an ageing control value used to control updating of the associated age indication value for any entry storing a block of metadata, and the dynamic ageing operation is arranged to determine the ageing control value in dependence on at least a training rate indication for the prefetch circuitry, where the training rate indication is indicative of a number of training inputs per memory access operation performed by the processing circuitry.

* * * * *